United States Patent [19]

Land et al.

[11] 3,750,551

[45] Aug. 7, 1973

[54] PHOTOGRAPHIC APPARATUS AND SYSTEM WITH AUTOMATIC FILM COVER EJECTION

[75] Inventors: Edwin H. Land, Cambridge; Peter P. Carcia, Reading, both of Mass.

[73] Assignee: Polaroid Corporation, Cambridge, Mass.

[22] Filed: Dec. 29, 1971

[21] Appl. No.: 213,318

[52] U.S. Cl. .......... 95/11, 95/19
[51] Int. Cl. .......... G03b 19/10
[58] Field of Search .......... 95/11, 19; 352/176

[56] References Cited

UNITED STATES PATENTS 3,017,803 1/1962 Sakaki .......... 352/176

*Primary Examiner*—John M. Horan
*Attorney*—Brown and Mikulka and Gerald L. Smith

[57] ABSTRACT

A highly automatic photographic camera of a variety having a receiving chamber for accepting a film laden cassette structure having a dark slide film cover. This dark slide is automatically removed from the camera when the cassette is inserted within the receiving chamber and a loading door is closed, the operator of the camera not having to perform any actuating steps. Switch logic is provided in response to movement of the loading door as well as in response to a counter mechanism of the camera. The invention further incorporates a flash suppression feature which is activated during the dark slide removal operation.

45 Claims, 15 Drawing Figures

INVENTORS
EDWIN H. LAND
PETER P. CARCIA

BY Brown and Mikulka
and
Gerald L. Smith
ATTORNEYS

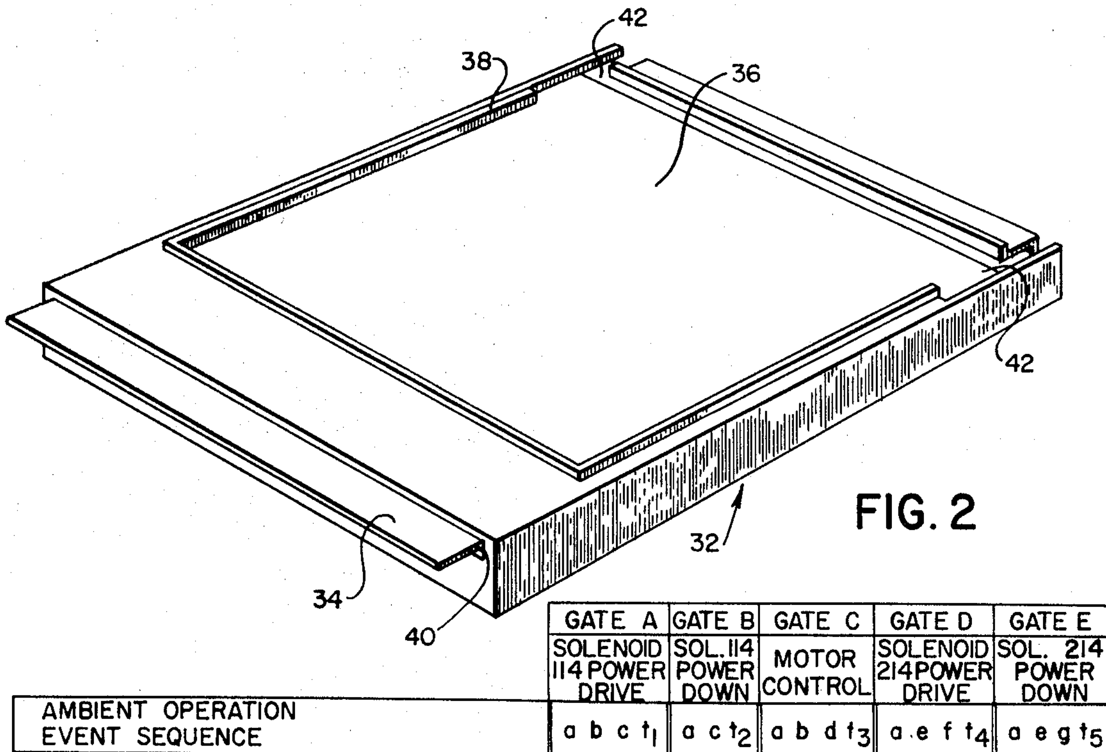

FIG. 2

| AMBIENT OPERATION EVENT SEQUENCE | | GATE A SOLENOID 114 POWER DRIVE a b c $t_1$ | GATE B SOL. 114 POWER DOWN a c $t_2$ | GATE C MOTOR CONTROL a b d $t_3$ | GATE D SOLENOID 214 POWER DRIVE a e f $t_4$ | GATE E SOL. 214 POWER DOWN a e g $t_5$ |
|---|---|---|---|---|---|---|
| 1 | $S_1$ CLOSED AND SOLENOID 114 ENERGIZED | 0 0 0 1 | 0 0 0 | 0 0 0 1 | 0 0 0 0 | 0 0 0 1 |
| 2 | EXP. MECH. BLADES CLOSED<br>MOTOR ENERGIZED<br>$S_4$ CLOSED | 0 1 0 0 | 0 0 0 | 0 1 0 0 | 0 0 0 0 | 0 0 0 1 |
| 3 | $S_5$ OPENS, MOTOR STOPS | 0 1 0 0 | 0 0 0 | 0 1 1 1 | 0 0 0 0 | 0 0 0 1 |
| 4 | $S_3$ OPENS, DELAY 172 COMMENCES | 0 1 0 0 | 0 0 0 | 0 1 1 1 | 0 0 1 0 | 0 0 0 1 |
| 5 | COMMENCE EXPOSURE | 0 0 1 0 | 0 1 1 | 0 0 1 1 | 0 0 1 0 | 0 0 0 1 |
| 6 | COMPARATOR THRESHOLD REACHED | 1 0 1 1 | 1 1 0 | 1 0 1 1 | 1 0 1 0 | 1 0 1 1 |
| 7 | EXP. MECH. BLADES CLOSED<br>MOTOR ENERGIZED<br>$S_4$ CLOSED | 1 1 1 0 | 1 1 0 | 1 1 1 0 | 1 0 1 0 | 1 0 1 1 |
| 8 | $S_5$ CLOSES | 1 1 0 0 | 1 0 0 | 1 1 0 1 | 1 0 0 0 | 1 0 0 1 |

FIG. 6

*INVENTORS*
EDWIN H. LAND
PETER P. CARCIA

BY *Brown and Mikulka*
*and*
*Gerald L. Smith*
*ATTORNEYS*

*INVENTORS*
EDWIN H. LAND
PETER P. CARCIA

BY Brown and Mikulka
and
Gerald L. Smith
*ATTORNEYS*

INVENTORS
EDWIN H. LAND
PETER P. CARCIA

BY Brown and Mikulka
and
Gerald L. Smith
ATTORNEYS

INVENTORS
EDWIN H. LAND
PETER P. CARCIA

BY Brown and Mikulka
and
Gerald L. Smith
ATTORNEYS

| | | GATE A | GATE B | GATE C | GATE D | GATE E |
|---|---|---|---|---|---|---|
| | | SOLENOID 114 POWER DRIVE | SOL. 114 POWER DOWN | MOTOR CONTROL | SOLENOID 214 POWER DRIVE | SOL. 214 POWER DOWN |
| FLASH OPERATION EVENT SEQUENCE | | a b c $t_1$ | a c $t_2$ | a b d $t_3$ | a e f $t_4$ | a e g $t_5$ |
| 1 | $S_1$ CLOSED AND SOLENOID 114 ENERGIZED | 0 0 0 1 | 0 0 0 | 0 0 0 1 | 0 0 0 0 | 0 0 0 1 |
| 2 | $S_4$ CLOSED, MOTOR ENERGIZED | 0 1 0 0 | 0 0 0 | 0 1 0 0 | 0 0 0 0 | 0 0 0 1 |
| 3 | $S_5$ OPEN, MOTOR STOPS | 0 1 0 0 | 0 0 0 | 0 1 1 1 | 0 1 0 1 | 0 1 0 0 |
| 4 | $S_3$ OPENS, DELAY 172 COMMENCES | 0 1 0 0 | 0 0 0 | 0 1 1 1 | 0 1 1 0 | 0 1 0 0 |
| 5 | EXPOSURE MECHANISM BLADES COMMENCE OPENING | 0 1 1 0 | 0 1 1 | 0 1 1 1 | 0 1 1 0 | 0 1 0 0 |
| 6 | SWITCH $S_4$ OPENS | 0 0 1 0 | 0 1 1 | 0 0 1 1 | 0 1 1 0 | 0 1 0 0 |
| 7 | DE ENERGIZE SOLENOID 214, FIRE FLASH | 0 0 1 0 | 0 1 1 | 0 0 1 1 | 0 1 1 0 | 0 1 1 1 |
| 8 | EXPOSURE MECHANISM BLADES COMMENCE TO CLOSE | 1 0 1 1 | 1 1 0 | 1 0 1 1 | 1 1 1 0 | 1 1 1 1 |
| 9 | $S_4$ CLOSES, MOTOR ENERGIZED | 1 1 1 0 | 1 1 0 | 1 1 1 0 | 1 1 1 0 | 1 1 1 1 |
| 10 | $S_3$ CLOSES | 1 1 0 0 | 1 0 0 | 1 1 1 0 | 1 1 0 0 | 1 1 0 1 |
| 11 | $S_5$ CLOSES, MOTOR STOPS | 1 1 0 0 | 1 0 0 | 1 1 0 1 | 1 0 0 0 | 1 0 0 1 |

FIG. 8

| | | GATES A B C D E | SWITCH $S_6$ | GATE F |
|---|---|---|---|---|
| | | OUTPUT STATES | LOGIC | |
| DARK SLIDE EJECTION EVENT SEQUENCE | | $t_1$ $t_2$ $t_3$ $t_4$ $t_5$ | | b d h $t_6$ |
| 1 | $S_7$ CLOSED, LOADING DOOR CLOSED | 1 0 1 0 1 | 1 | 0 0 1 0 |
| 2 | EXPOSURE MECHANISM BLADES CLOSED, MOTOR ENERGIZED | 0 0 0 0 1 | 1 | 1 0 1 0 |
| 3 | $S_5$ OPENING | 0 0 1 0 1 | 1 | 1 1 1 1 |
| 4 | ZERO EXPOSURE OVERRIDE | 0 0 0 0 1 | 1 | 1 1 1 1 |
| 5 | $S_3$ OPENS, MOTOR ENERGIZED | 0 0 0 0 1 | 1 | 1 1 1 1 |
| 6 | $S_3$ CLOSES | 0 0 0 0 1 | 0 | 1 1 0 0 |
| 7 | COUNTER AT "1"—$S_6$ OPENS | 0 0 0 0 1 | 0 | 1 1 0 0 |
| 8 | $S_5$ CLOSES, MOTOR DE ENERGIZED | 0 0 1 0 1 | 0 | 1 0 0 0 |

FIG. 10

*INVENTORS*
EDWIN H. LAND
PETER P. CARCIA
BY Brown and Mikulka
and
Gerald L. Smith
*ATTORNEYS*

INVENTORS
EDWIN H. LAND
PETER P. CARCIA

BY Brown and Mikulka
and
Gerald L. Smith
ATTORNEYS

INVENTORS
EDWIN H. LAND
PETER P. CARCIA

BY Brown and Mikulka
and
Gerald L. Smith
ATTORNEYS

PHOTOGRAPHIC APPARATUS AND SYSTEM WITH AUTOMATIC FILM COVER EJECTION

BACKGROUND

Photographic cameras intended for use by amateur operators preferably are designed with a viewpoint of diminishing requisite preparatory adjustments as well as post exposure procedures otherwise required to obtain a photograph. Several automatic features have been introduced or proposed to minimize both post-exposure and pre-exposure camera preparations. For instance, such functions as exposure control can be regulated through the media of light responsive control circuits. Additionally, cameras incorporating self-processing features have been devised in which motorized roll systems automatically process film units following and as an adjunct to each exposure thereof. Further, film loading has been simplified with the introduction of disposable film cassettes or containers designed for positioning film units properly within a camera merely by direct insertion through the loading access door of a receiving chamber located therein.

One such cassette structure is described and claimed in a U.S. Pat. No. 3,453,662 by Irving Erlichman. Designed to permit the noted simplified loading procedures, the cassette additionally is intended for use with an automated camera which operates to process film insitu immediately following or as an adjunct to an exposure. Photographic materials within this cassette are present as a stack or assemblage of individual film units, each of which is formed incorporating a pod of processing fluid. Described in detail in a U.S. Pat. No. 3,415,644 by Edwin H. Land, entitled "Novel Photographic Products and Processes", processing fluid within the noted pods is spread within each film unit to cause the formation of a visible positive image. Above the stacked assemblage of film units, the housing of the cassette is formed having a film frame opening which, when positioned within the receiving chamber of a camera, sequentially locates each film unit at the exposure plane thereof. To permit the noted simplified loading, these cassettes utilize a feature stemming from relatively early photographic film handling procedures. Prior to insertion within the noted receiving chamber, the film frame opening is secured from light by a dark slide which is removed after the cassette has been locked in place within the camera. Of course, it is necessary that the operator remember to remove the dark slide before depressing a shutter release or start button of the camera. Removal of the dark slide constitutes a pre-exposure preparatory step required of the camera operator and, as a consequence, detracts from a desirably full automaticity.

SUMMARY

The invention now presented concerns a highly automated photographic camera of a type accepting a cassette structure having a dark slide film cover. This dark slide is automatically removed when the cassette is inserted, the operator of the camera not having to as much as push a button to effect the removal.

A feature and object of the invention is to provide photographic apparatus for use with film containers or cassettes of a variety having a light entrance portion through which photosensitive material may be exposed as well as a removable cover or dark slide so positioned to prevent the passage of actinic radiation therethrough. The film container is insertable within a receiving chamber disposed within a housing of the apparatus and which serves to position the container for exposure of its photosensitive units. Drive means are provided which are actuable to remove the cover from a position preventing passage of radiation through the entrance portion. Control means are provided for actuating the drive means automatically in response to the reception of the container within the receiving chamber.

An additional object of the invention is to provide a system for exposing photographic material in which a cassette, configured to retain an assemblage of photographic units for sequential presentation at an exposure opening, as well as being configured having an egress portion for effecting the removal of the photographic units following their presentation, is provided in combination with an automatic camera. The camera is formed having a receiving chamber within which the cassette may be inserted. Further, the camera includes a processing station which is operative, when activated, to remove the photographic materials from the cassette through the egress portion thereof. Drive means are provided to actuate the processing station and loading access means in the form of a pivotal door are provided with the receiving chamber. A control arrangement within the camera selectively actuates the drive means and, in particular, is operative to automatically operate the drive means in response to the positioning of the noted cassette within its receiving chamber and movement of the loading access door into its closed position. With the latter arrangement, automatic ejection of a dark slide or photographic unit may be realized only following a proper insertion of a cassette within the camera. Further, the operator of the camera need not be concerned with the necessary step of dark slide removal when loading film therein.

Another feature and object of the invention is to provide an automatic camera and photographic apparatus for accepting a cassette structure having a dark slide. The camera automatically removes the dark slide in response to switching commands received, not only upon closure of a loading access door leading to the chamber receiving the cassette, but also in response to a switching command established in consequence of the removal of a cassette from the camera. With such an arrangement, the automatic dark slide removal feature of the system and apparatus does not interfere with other cycle control systems which may be incorporated therewith.

Another feature and object of the invention is to provide a photographic apparatus and system which incorporates an innovation effecting the automatic removal of the dark slide of a cassette in consequence of the insertion of the cassette within a receiving chamber within the apparatus, as well as the closure of an access door. Further, proper insertion of the cassette within the apparatus is required for the automatic ejection feature to be activated. In the latter regard, the cassette structure of the system is one incorporating a battery power supply for powering the drive system which provides for dark slide ejection. The contact terminals for this power supply are located at predetermined positions upon a side of the cassette and, consequently, improper insertion of the cassette within the camera will result in an open circuit condition to the drive system. As a consequence, the dark slide cannot be removed to inadvertently expose the film within the cassette in the event of improper insertion within the camera. Further, the dark slide removal feature is not enabled unless a cassette is newly inserted within the receiving chamber of the apparatus. Once such a new cassette is inserted within the receiving chamber, the automatic dark slide removal feature is not activated until such time as the receiving chamber of the apparatus is closed and latched.

Other objects of the invention will in part be obvious and will in part appear hereinafter.

The invention accordingly comprises the apparatus and system possessing the construction, combination of elements and arrangement of parts which are exemplified in the following detailed disclosure. For a fuller understanding of the nature and objects of the invention, reference should be had to the following detailed description taken in connection with the accompanying drawings.

BRIEF DESCRIPTION OF THE DRAWINGS:

FIG. 2 is a perspective view of a cassette structure insertable within the camera of FIG. 1;

FIG. 6 is a truth table or schedule of operational events performed by the control system of the camera of FIG. 1, showing in logic form the input and output status of gate functions incorporated within the circuit of FIG. 5 as it operates under ambient lighting conditions;

FIG. 8 is a truth table for operational events performed by the control system of the camera of FIG. 1, showing in logic form the input and output states of gate functions of the circuit of FIG. 5 when the circuit is operated for flash mode performance;

FIG. 10 is a truth table for operational events performed by the control system of the camera of FIG. 1, showing in logic form the input and output status of gate functions incorporated within the circuit of FIG. 5 as it operates to automatically eject a dark slide;

DETAILED DESCRIPTION

In the description to follow, a photographic camera which performs a somewhat elaborate series of operational events in the course of a photographic cycle is discussed. Inasmuch as this series of events is selectively altered between ambient illuminational and flash mode performance, as well as to derive automatic ejection of a dark slide, the description necessarily incorporates description of each of these cycle alterations. To aid in the description, a block logic diagram for these variations in performance is referred to intermittently as the description unfolds.

Camera and Cassette — General Structure

Figures 1, 3:
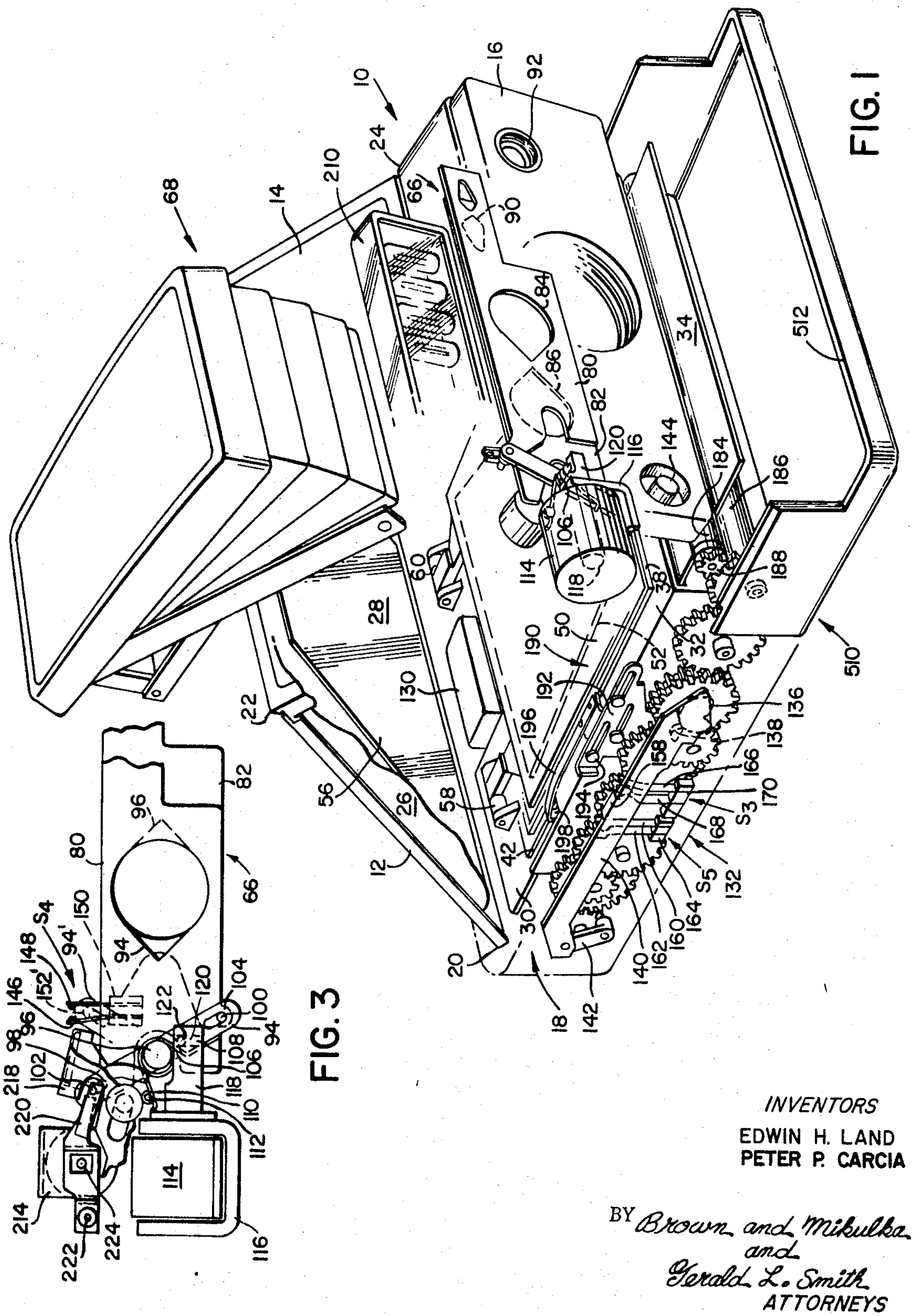
FIG. 1 is a pictorial view of a fully automatic hand held camera incorporating the automatic dark slide removal features of the instant invention, the view having portions broken away to reveal internal structure.
FIG. 3 is a fragmentary plan view of an exposure mechanism incorporated in the camera of FIG. 1.

Referring to FIG. 1, a fully automatic camera incorporating the features of the instant invention is portrayed generally at 10. The several articulated housing components of camera 10, including rear wall 12, forward wall 14, and exposure control housing 16 are pivotally associated with a base 18 so as to be foldable thereinto in nesting fashion. When so folded from the erected configuration shown, the camera 10 assumes a thin and compact shape suiting it to be conveniently carried in the pocket of a garment. The specific hinge connections providing for the articulated structure, while not being visible in the figure, are positioned at axes 20, 22, 24 and at the lower rear portion of exposure control housing 16. When erected for making an exposure, rear wall 12, forward wall 14 and exposure control housing 16 combine in conjunction with an opaque flexible bellows, a fragment of which is illustrated at 26, to define an exposure chamber generally depicted at 28.

Base 18 includes an inner frame assembly, a portion of which is shown at 30. Inner frame assembly 30 as well as the outward portions of base 18 cooperate to provide structural support for numerous instrumentalities of the camera. For instance, frame 30 is configured to define a receiving chamber for retaining and securing a film laden cassette or container 32 at the bottom of exposure chamber 28.

Looking additionally to FIG. 2, cassette 32 is of generally flat, rectangular shape and contains a stacked assemblage of photographic units, for instance that shown at 34. The photosensitive ones of units 34 are arranged for sequential presentation at a light entrance portion 36 formed in the upper surface of cassette 32. Entrance portion 36 has a periphery which is defined by a ridge 38, the underside of which serves as a seat against which the uppermost unit 34 abuts. The forward wall of cassette 32 is formed having an elongate slot 40 disposed thereacross. Slot 40 serves as an egress means providing for the sequential removal of each of the units 34. Cassette 32 also is formed having slots or openings in the upward face thereof as at 42. Slots 42 permit the insertion of a component of a pick mechanism which functions to impart initial movement to units 34 as they are removed from the container. When cassettes as at 32 are initially procured from a supplier, the photosensitive film units contained therewithin are secured from light otherwise entering opening 36 by a dark slide having a configuration closely similar to the photosensitive film units positioned beneath it. Once cassette 32 is positioned within its receiving chamber in camera 10, this dark slide must be removed prior to commencing a first photographic cycle. A cross-sectional view of such a dark slide is shown at 44 in FIG. 13.

Returning to FIG. 1, camera 10 operates in a modified reflex fashion, being convertible between viewing and exposure operational modes by a reflex assembly, including a somewhat planar reflex reflecting component 50. Shown at an intermediate position, evidenced during a transition from one terminal position to another, the component 50 is configured having a mirror surface 52 mounted upon its underside and a viewing surface 54 positioned upon or forming its upward surface. In the course of a photographic cycle, reflex component 50 is moved from a position against ridge 38 of cassette 32, where it serves to secure light entrance portion 36, to an exposure position abutting against a mirror 56 located upon the inner side of rear wall 12. Movement between the viewing mode and exposure mode positions is pivotal, the component 50 being coupled to inner frame 30 at hinges 58 and 60.

When component 50 is positioned over ridge 38 of cassette 32 to secure the exposure plane of the camera, a viewing-focusing mode optical path is established. This path extends from a taking lens mounted at 64 in exposure housing 16, through an exposure mechanism depicted generally at 66 which establishes an aperture opening of maximum available width, thence to the reflecting surface of mirror 56 at the rear of the camera and thence to viewing surface 54 on the upward side of component 50. Viewing surface 54 is configured having a texture and optical design facilitating the focusing of the image of the scene to be photographed. This image may be viewed by the camera operator through a collapsible optical entrance assembly depicted generally at 68. A configuration suited for viewing surface 54 is described and claimed in a copending application for U.S. Patent application, Ser. No. 83,030, filed Oct. 22, 1970 by Nathan Gold, entitled "Reflective Imaging Apparatus" and assigned in common herewith, now U.S. Pat. No. 3,690,240 while the assembly 68 and its related internal components are described in detail in a copending application for U.S. Patent by James G. Baker, filed Dec. 15, 1970, entitled "Reflex Camera and Viewing Device", Ser. No. 98,356 and assigned in common herewith.

Figure 4:
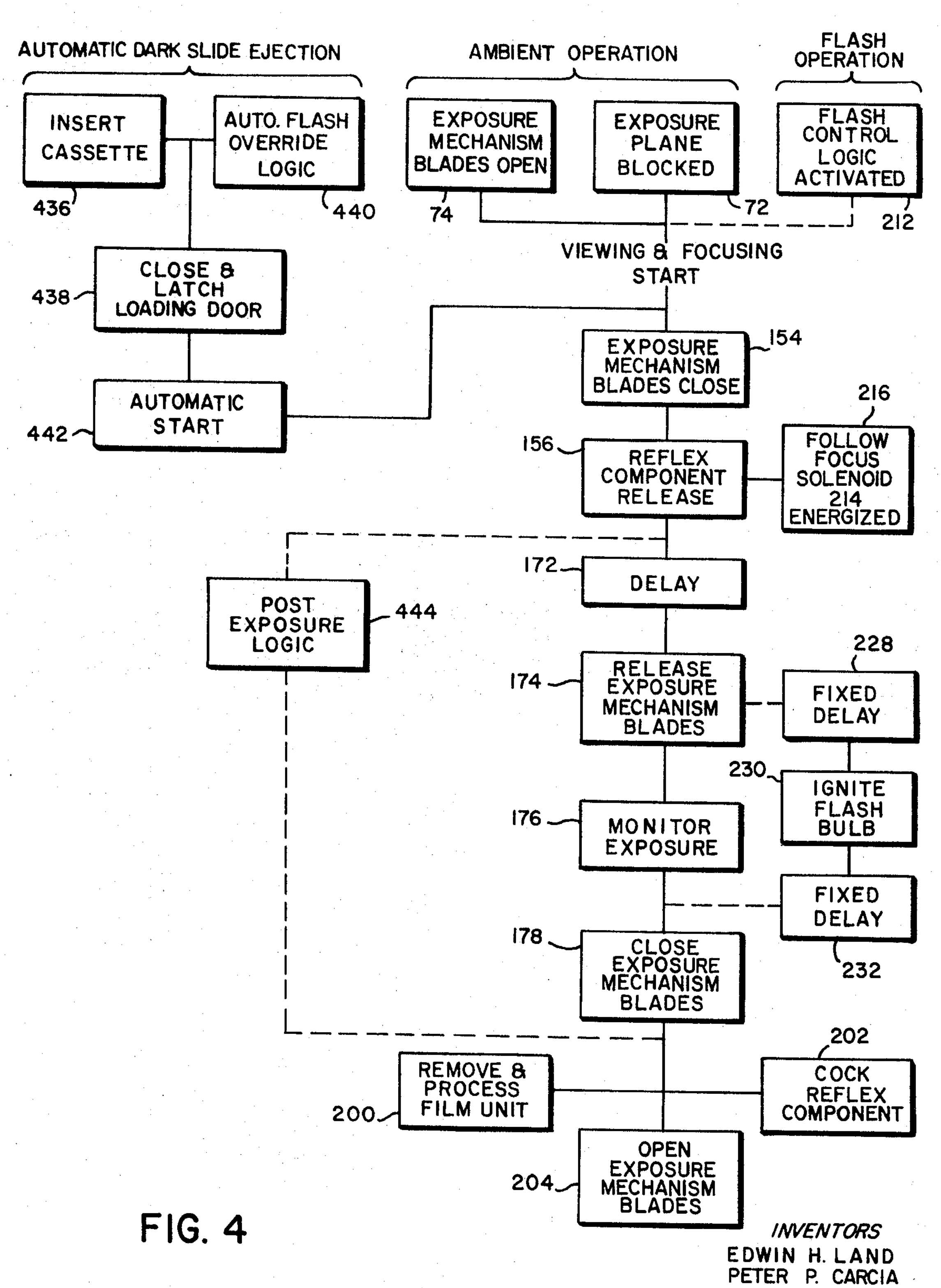
FIG. 4 is a block logic diagram showing the sequence of events occurring during photographic cycles of the camera of FIG. 1.

The viewing focusing mode of camera 10 is represented in FIG. 4 at function boxes 72 and 74 which, respectively, indicate that the exposure plane is blocked by virtue of the positioning of reflex component 50 and that the blades of exposure mechanism 66 are open.

The exposure mode optical path orientation of camera 10 is established by pivoting reflex component 50 into abutment against or closely adjacent mirror 56 at rear wall 12. In this orientation, the optical path now extends from taking lens 64 and exposure mechanism 66 to mirror 52 positioned on the underside of reflex component 50, thence to the uppermost one of the film or photographic units at 34 positioned within cassette 32. It may be noted that this uppermost film unit is positioned at the exposure plane of the camera.

Camera — Exposure Mechanism

The exposure control system of camera 10 is called upon to perform a number of operational steps in the course of a photographic cycle. For instance, for viewing and focusing, the mechanism 66 establishes an aperture opening of maximum width to promote optimum viewing and focusing. During the conversion of the optical path of the camera 10 from a viewing-focusing mode to an exposure mode orientation, mechanism 66 is called upon to secure exposure chamber 28 by remaining in a fully closed condition. Further, in the course of an exposure interval, the mechanism 66 and its related control provide for a dual exposure parameter regulation in which both aperture and exposure interval are controlled in accordance with a predetermined, optimized photographic program. For instance, under such a program, a relative aperture should be selected automatically to optimize depth of field, while exposure interval is selected to maximize taking speed.

Looking to FIGS. 1 and 3, exposure mechanism 66 is shown to be formed having two blades or elements 80 and 82 which slidably ride in a track (not shown) mounted within exposure housing 16. Each blade 80 and 82 is formed having a teardrop shaped aperture opening as shown respectively at 84 and 86. Additionally, the blades are formed having secondary openings, shown respectively at 88 and 90, which move in synchronism with openings 84 and 86 before the detecting elements of a photosensing network positioned behind an entrance optical assembly 92. Openings 84 and 86 of respective blades 80 and 82 are mounted for movement across the optical path of camera 10 as it is established at taking lens 64. Depending upon the position of blades 80 and 82, openings 84 and 86 symmetrically overlap to define selectivelY varying aperture sizes. Secondary openings 88 and 90 are configured in correspondence with the contours of respective openings 84 and 86. These openings also move in mutual symmetry over the optical path of the light sensing network.

Blades 80 and 82 move in mutual symmetry as a result of their connection with a walking beam shown at 94. Walking beam 94 is formed having a centrally disposed hub portion 96 which is journaled for rotation about an upstanding stud (not shown) extending from the rearward portion of exposure control housing 16. Elongate slots, as at 98 and 100, are formed in the outward tip portions of walking beam 94 for the purpose of providing connection with pins 102 and 104 extending, respectively, from blades 80 and 82.

Thus, interconnected, the blades 80 and 82 move simultaneously and in correspondence with each other to define a continuous progression of symmetrically configured variable aperture openings over the camera optical path as well as over the optical path of its light sensing network. Elongate slots 102 and 104 serve the function of accommodating the horizontally restricted movement of blades 80 and 82.

Walking beam 94 is biased for rotation toward a terminal position. This bias is derived from a spring 106, the central portion of which is wound about hub 96. The movable end 108 of spring 106 is configured for biasing contact against walking beam 94, while its stationary end 110 is configured to abut against a pin 112 extending from a rear portion of exposure housing 16. With spring 106 so connected, the exposure mechanism is biased for moving blades 80 and 82 into a normally open orientation wherein openings 84 and 86 as well as 88 and 90 cooperate to define widest available apertures. This fully open condition of mechanism 66 is shown in FIG. 3.

Movement of blades 80 and 82 from their normally open orientation, permitting viewing and focusing, into a closed orientation, blocking the passage of light along the optical path of the camera, is carried out by a tractive electromagnetic drive present as a solenoid 114 mounted within exposure housing 16 upon a bracket as at 116. Solenoid 114 is designed having an internally disposed cylindrical plunger or armature 118 which retracts inwardly within an excitation winding upon energization thereof. Plunger 118 is connected to walking beam 94 by a comb-shaped connector 120 slidably fitted over pin 122 (FIG. 3) extending from beam 94.

When solenoid 114 is energized to retract plunger 118, walking beam 94 is rotated rapidly against the bias of spring 106 to move blades 80 and 82 into the fully closed orientation shown in FIG. 1. Note in FIG. 1 that the optical path of camera 10, as it is extensible through taking lens 64, is completely blocked, thereby securing exposure chamber 28 from the presence of light.

Reflex Component Drive Linkage

Figure 14:
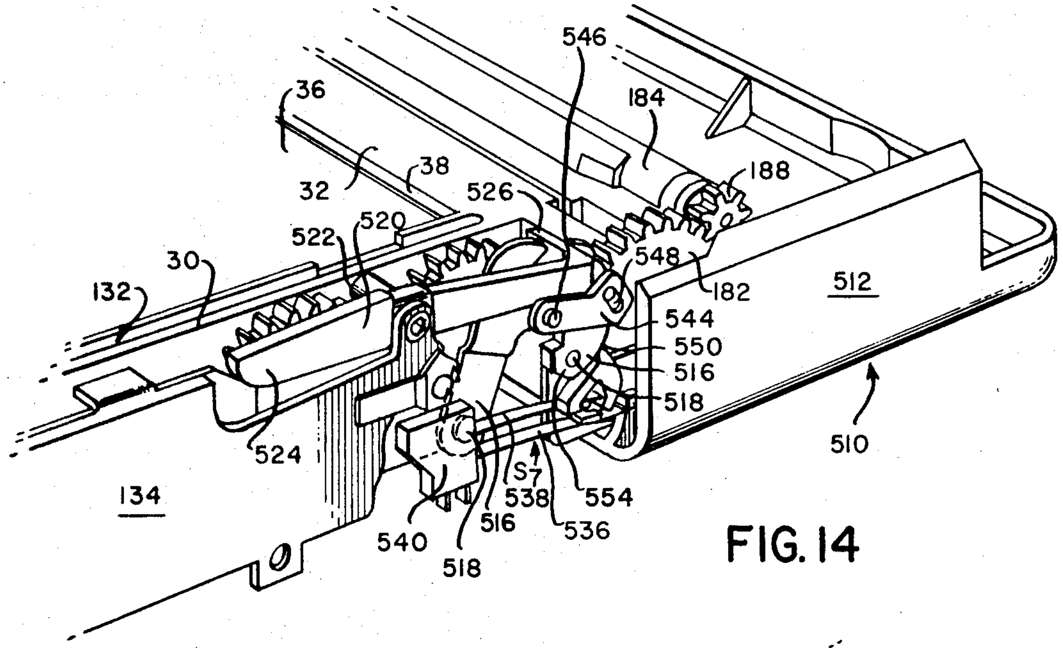
FIG. 14 is a partial perspective view of the forward portion of the base of the camera of FIG. 1 with portions broken away to reveal internal structure.

During a viewing-focusing operational mode, when spring 106 holds blades 80 and 82 in a terminal position defining maximum aperture, reflex component 50 is held in its light securing position over light entrance portion 36 of cassette 32 by a driven instrumentality operating upon component 50 through hinge 58. Described in detail and claimed in a copending application for U.S. Patent by E. H. Land, I. Blinow and V. K. Eloranta, entitled "Reflex Camera", Ser. No. 134,733, filed Apr. 16, 1971 and assigned in common herewith, now U. S. Pat. No. 3,697,271 the driven instrumentality is regulated from a control system which utilizes the output of a motor 130 to selectively drive an elongate, thin gear train, certain components of which are shown generally at 132, extending along one side of camera 10. The various geared components of gear train 132 are rotatably mounted upon camera 10 between inner frame 30 and an outer plate 134 (FIG. 14). Two reduction ratio circuits are present in gear train 132, one such circuit terminating in a phase control cam 136 which is rotatably driven through one revolution during the course of a single photographic cycle. Cam 136 operates in conjunction with a cam follower 138 positioned upon the inwardly facing side of an elongate ram 140 slidably mounted along gear train 132. Ram 140 is drivably connected to an input bell crank 142 which, in turn, is coupled to reflex component 50 through hinge 58 and a drive spring and associated linkages which function to drive component 50 into its exposure position adjacent rear wall 12. The drive spring as well as other associated linkages required to assert a bias urging reflex component 50 into its exposure position are described in detail in the noted U.S. Pat. No. 3,697,271.

By regulating the rotational position of phase control cam 136 from motor 130 and its associated control system, cam follower 138 and ram 140 serve to retain reflex component 50 in its exposure plane securing position. For instance, when component 50 is so retained, cam 136 is in a radial orientation wherein it holds follower 138 and associated ram 140 at a terminal rearward position. A controlled energization of motor 130 early in a given photographic cycle causes the gear train to rotate cam 136 to a position whereat follower 138 releases from follower contact therewith, permitting ram 140 to be driven by the noted drive spring into a terminal forward position and, as a consequence, simultaneously permitting reflex component 50 to be driven into its exposure mode position against rear wall 12.

Photographic Cycle — Ambient Illumination

Referring additionally to FIG. 4, a photographic cycle is commenced with the depression of a start button 144 located on exposure housing 16. Depression of this button closes appropriate switches to energize the control system of the camera which, in turn, effects the energization of the winding of solenoid 114. When so energized, solenoid 114 drives blades 80 and 82 to the closed position shown in FIG. 1. As blades 80 and 82 reach this light blocking position, leaves 146 and 148 of a switch generally designated as S4 are closed. As revealed in FIG. 3, switch S4 additionally includes an insulative base 150 fixed to an inner frame portion of exposure housing 16. Closure of switch S4 is carried out when an insulative contact connected to walking beam 94 drives leaf 146 into contact with leaf 148. The position of walking beam 94 when closure of switch S4 is effected is shown in phantom in FIG. 3 at 94'.

When blades 80 and 82 block the optical path of camera 10, as designated at function block 154, exposure chamber 28 is secured and operational mode conversion is permitted to take place. Accordingly, as indicated at function block 156, the control system of the camera energizes motor 130 for a short period of time to actuate gear train 132, thereby driving phase control cam 136 a sufficient amount to release ram 140 for movement. When so released, ram 140 permits the drive springs associated with hinge 58 to move reflex component 50 into its exposure position against rear wall 12.

As ram 140 commences forward movement in conjunction with the noted release, a tab 158 extending inwardly therefrom releases from engagement with a resilient leaf 160 of a switch identified generally as $S_5$. Switch $S_5$ additionally includes a resilient leaf 162 which is supported along with leaf 160 from an insulative base 164 fixed to outer plate 134 of base 18. Accordingly, the contacts 160 and 162 of switch $S_5$ are opened in correspondence with the initial movement of component 50 from its viewing mode position. As reflex component 50 somewhat closely approaches its seated position against rear wall 12, tab 158 contacts leaf 166 of another switch depicted generally at $S_3$. Leaf 166 is normally in contact with a second leaf 168 of switch $S_3$ and both leaves are supported from an insulative base 170 also fixed to outer plate 134. It may be noted, therefore, that the contacts of switch $S_3$ are opened when reflex component 50 approaches its seated position prior to an exposure.

The control system of camera 10 monitors the movement of component 50 until such time as it is seated at its exposure position and, accordingly, provides a delay function prior to the carrying out of a next succeeding operational event. This delay is depicted in FIG. 4 at 172.

Upon appropriate time-out of delay 172, the control system of the camera deenergizes the excitation winding of solenoid 114, thereby permitting spring 106 to drive blades 80 and 82 toward a terminal position representing maximum aperture opening. Simultenaously, the light sensing network of the control system evaluates scene lighting from entrance assembly 92 as it is affected by moving openings 88 and 90. These exposure mechanism blade release and monitoring functions, respectively, are depicted by function blocks 174 and 176. When the control system evaluation function determines that the exposure interval should be terminated, the excitation winding of solenoid 114 is again energized to retract plunger 118 and rapidly close blades 80 and 82. This exposure terminating function is depicted at function block 178. Energization of the excitation winding of solenoid 114 continues to block the optical path of the camera, thereby securing exposure chamber 28 until reflex component 50 has reassumed its viewing-focusing mode orientation.

With exposure chamber 28 secured by the closure of blades 80 and 82, the control system of camera 10 re-energizes motor 130 to drive gear train 132, thereby rotating cam 136. As cam 136 is rotated, contact is reasserted with follower 138 to drive ram 140 rearwardly and cock reflex component 50 into its viewing mode position. Simultaneously with this cocking activity, a second reduction circuit within gear train 132 functions to drive a processing station including processing roles 184 and 186. Connection between the processing station is made at uppermost role 184 through a drive pinion 188.

At the commencement of the second energization of motor 130, while roles 184 and 186 are being driven, a pick mechanism illustrated generally at 190 is actuated to engage the uppermost photographic unit 34, move it through forwardly disposed egress slot 40 and into the bite or point of tangency between rotating processing rolls 184 and 186. The photographic unit engaged and moved into rolls 184 and 186 may include dark slide 44. Described in detail in a copending application for U.S. Patent, Ser. No. 171,127 by Edwin H. Land, entitled "Film Advancing Apparatus", filed Aug. 12, 1971 and assigned in common herewith, mechanism 190 includes a carriage assembly 192 which is selectively driven from a cam (not shown) present within gear train 132. Slidably mounted upon inner frame 30 by pin and slot assemblies, a typical one of which is shown at 194, carriage 192 is configured supporting a resilient pick member 196, the outward tip 198 of which is configured to extend into and slide along slot 42 of cassette 32. Carriage 192 is spring biased to position tip 198 at the rear of slot 42 of cassette 32. At this position, the pick 196 engages the rear edge of a photographic unit 34. When cam driven from gear train 132, the assembly of carriage 192 and pick 196 moves each photographic unit 34 through slot 40 until it is engaged by rolls 184 and 186. Carriage 192 is latched at its forwardmost position following performance of its pick function and is returned under spring bias to its rearward station at the completion of a photographic cycle.

The photosensitive ones of photographic units 34 are processed by passing through rolls 184 and 186. Described in detail in the above-noted U.S. Pat. No. 3,145,644, these film units are structured to contain a processing fluid which is spread therewithin to cause the formation of a visible positive image. The processing feature of camera 10 is depicted in FIG. 4 by functional block 200, while the cocking of reflex component 50 is represented by function block 202. At the termination of the above-described cocking and processing functions, the control system of camera 10 is automatically shut down to terminate a photographic cycle. Such shut down deenergizes the excitation winding of solenoid 114 to permit shutter blades 80 and 82 to open under the bias of spring 106. The latter event is depicted in FIG. 4 by function block 204.

Photographic Cycle — Flash Illumination

In the discussion above, a photographic cycle of camera 10 has been described as it relates to operation under ambient lighting conditions. To operate camera 10 with artificial or flash illumination, a packaged multilamp flash assembly such as that shown at 210 is mounted upon exposure housing 16. When so mounted, assembly 210 serves to arm or activate a flash control logic within the control system of the camera. Looking additionally to FIG. 4, the photographic cycle carried out by camera 10 with such flash control logic activation, as shown at 212, is depicted by a series of additional operational events or by operational events bypassing those suited for ambient performance. For instance, following viewing and focusing and depression of start button 144, solenoid 114 is energized to close exposure mechanism blades 80 and 82 as is shown at function block 154. As reflex component 50 is released, as indicated at block 156, and switch $S_5$ is opened, the excitation winding of a second follow-focus solenoid 214 forming part of exposure mechanism 66 is energized. Such energization is depicted at function block 216 in FIG. 4. Solenoid 214 represents the drive component of a follow-focus mechanism described in detail and claimed in a corresponding application for U.S. Patent by L. M. Douglas entitled "Apparatus and System for Flash Photography", Ser. No. 168,671 filed Aug. 3, 1971 and assigned in common herewith. The follow-focus mechanism provides a mechanical coupling between the focusing system of camera 10 and the aperture adjusting feature of exposure mechanism 66. A follow-focus type aperture setting is based upon an application of the inverse square law of light energy propagation wherein the light energy available from a given source is considered to vary inversely with the square of the distance from that source. Referring additionally to FIG. 3, when taking lens 64 is appropriately focused, an interceptor linkage, a portion of which is depicted at 218, is positioned such that, when actuated, it will arrest the opening movement of blades 80 and 82 at a position defining a proper aperture value. Actuation of interceptor linkage 218 is carried out by a pull-down bar 220. Bar 220 is loosely hinged to a portion of exposure housing 16 at 222 and connected to the internally disposed plunger of solenoid 214 at 224. As noted in FIG. 4, solenoid 214 is not energized until after the closure of exposure mechanism blades 80 and 82. When so energized, pull-down bar 220 is drawn inwardly by the plunger of solenoid 214 to position interceptor linkage 218 at a location engageable with a portion of walking beam 94 at such time as the beam is released for movement under the bias of spring 106 (see function block 174).

Upon release of exposure mechanism blades 80 and 82, as depicted at 174, the control system of camera 10 provides a fixed delay, as functionally indicated at 228, which serves to hold the next sequential operational event in abeyance until such time as walking beam 94 would have been capable of establishing a maximum available exposure aperture width. Following time-out at delay 228, a flashbulb within assembly 210 is ignited, as depicted at function block 230. The resulting illumination is not monitored as described earlier in connection with function block 176, and a fixed delay is imposed having a duration selected to permit full utilization of the output of the flash lamp ignited at assembly 210. Following this fixed delay as shown at block 232, the photographic cycle continues, as depicted at function block 178, with the closure of exposure mechanism blades 80 and 82 as well as the carrying out of processing and cocking functions. The excitation winding of solenoid 214 is selectively deenergized following fixed delay 228, permitting bar 220 to return to a standby status under a spring bias in preparation for a next photographic cycle.

Control Circuit

Figure 5:
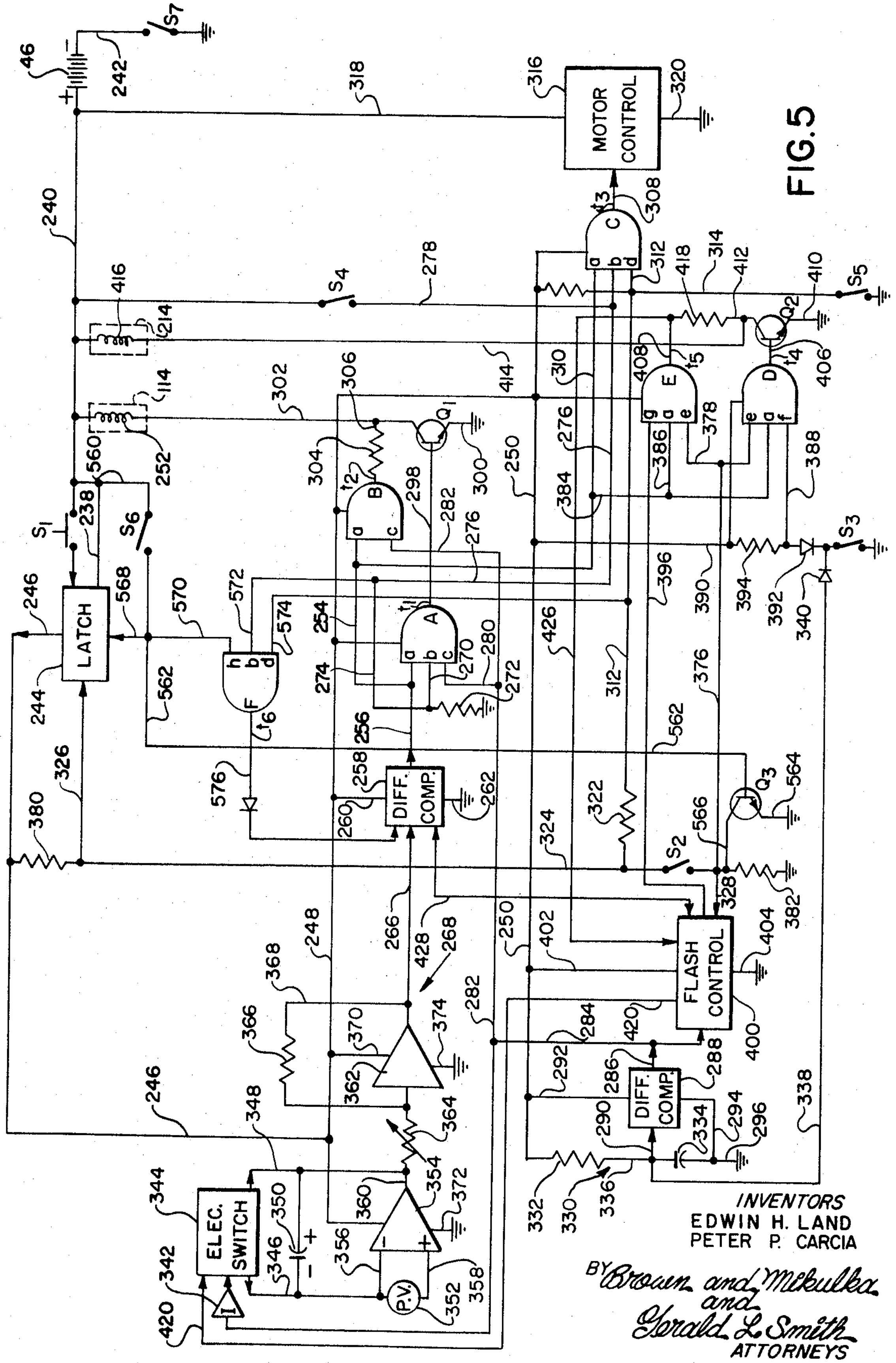
FIG. 5 is a schematic diagram of a control circuit used in conjunction with the control system of the camera of FIG. 1.
Figure 7:
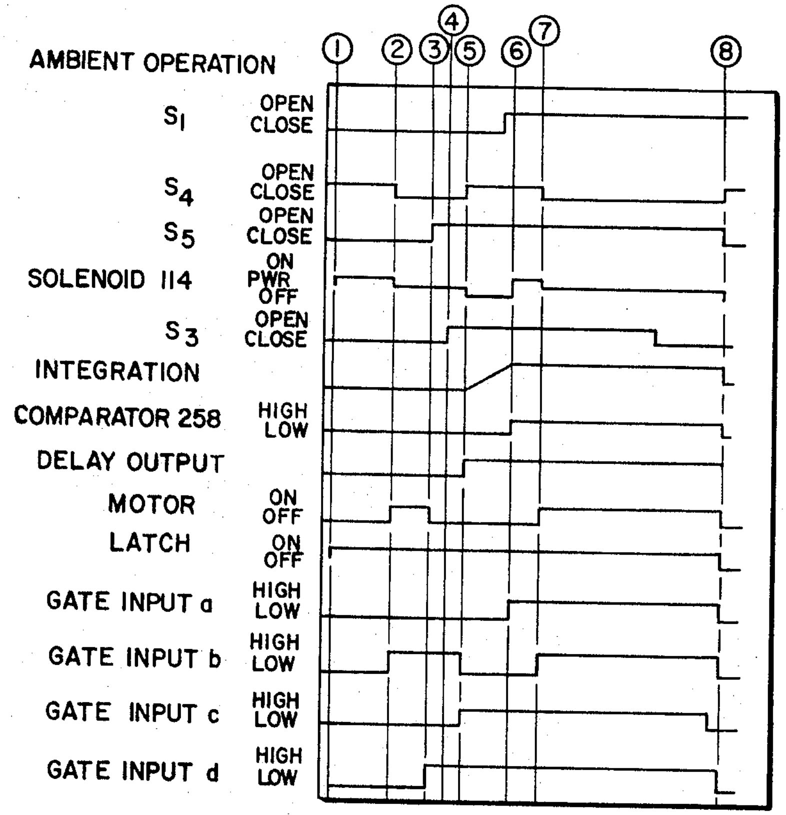
FIG. 7 is an energization status chart for various components of the circuit of FIG. 5 as they operate throughout a photographic cycle under ambient illumination conditions.

Referring to FIGS. 5, 6 and 7, a schematic diagram for a control circuit along with related truth tables and energization state diagrams serving to carry out the operational events discussed above are displayed. The circuit of FIG. 5 includes a series of multifunction gates designated A through E as well as a more conventional and gate F. The inputs and outputs for these gates are depicted in Boolean enumeration in the truth tables of FIGS. 6, 8 and 10. For purposes of understanding the tabulations within these figures, as well as to facilitate the description to follow, when the inputs or outputs of the listed components are at ground reference potential, they are referred to as "low" and, additionally, such input or output is digitally identified as "0". Conversely, when these inputs and outputs assume or approach the voltage status of the power supply of the control circuit, they are referred to as being "high" and are given the binary designation "1". The operational events as tabulated and numbered in FIGS. 6, 8 and 10 are again identified by the same encircled numeration in the corresponding energization state diagrams, respectively, at FIGS. 7, 9 and 11. In these diagrams, the status of switches $S_1 - S_7$ of the circuit as well as the energization states of various components thereof are shown in comparative time scale fashion. It may be noted further that certain of the gate input terminals receive common signals. These common terminals are identified by the letters *a* through *g*. Additionally, the outputs of gates A through G are identified, respectively by the letters $t_1$ through $t_7$.

Control Circuit — Ambient Mode

Looking to FIGS. 5, 6 and 7, the circuit arrangement for controlling camera 10 under ambient lighting conditions is illustrated. As noted earlier, a photographic cycle is commenced with the depression of start button 144. This depression serves to close a switch designated $S_1$ in the figure. Closure of switch $S_1$ activates a primary power line 240 connected with the positive terminal of battery 46. The opposite terminal of battery 46 is connected by line 242 through a closed switch $S_7$ to ground. Thus activated, primary power line 240 serves to energize a latching network depicted functionally by block 244. Described in detail and claimed in a copending application for U.S. Patent by J. P. Burgarella, P. P. Carcia and R. C. Kee, Ser. No. 213,317, filed Dec. 29, 1971 and assigned in common herewith, network 244 operates under two energization states. The first of these states permits the operator of camera 10 to abort a photographic cycle until such time as switch $S_5$ is opened. Following the opening of switch $S_5$, a second energization state at network 244 under power from line 238 provides for continuous energization of the entire circuit even though the contacts of switch $S_1$ are separated.

The output of latching network 244 is present at a power distribution line 246 which, in turn, is connected to a branch power line 248. Branch power line 248 is connected to a second branch power line 250 and these two lines serve to power and assert initial control conditions over the various gates and components within the entire circuit. These conditions, as they exist at the commencement of a photographic cycle, are tabulated at Event No. 1 of FIG. 6. As described in connection with function block 154 of FIG. 4, the initial operational event is that of energizing the excitation winding 252 of solenoid 114. This is carried out by asserting select input conditions to the input terminals of multifunction GATES A and B. Looking to these inputs, input terminals *a*, commonly connected by line 254, exhibit an initial low status by virtue of their connection along line 256 to the output of a differential comparator 258. Comparator 258 may be of conventional design, operating as a non-inverting amplifier. Energized from branch power line 248 through line 260 and coupled to ground through line 262, the output at line 256 of comparator 258 remains low until a signal is received at any of its input lines 576, 428 or 266 which is at least equal to a predetermined triggering reference or threshold level. Upon receipt of such signal, the output at line 256 assumes a high status. For example, such input at line 266 is derived from a control signal generated at an exposure control network designated generally as 268.

Gate input terminal *b* of GATE A evidences a low state by virtue of its connection through line 270 and limiting resistor 272 to ground. Additionally, this low status is permitted as a result of the connection of line 270 through lines 274, 276 and 278 to switch $S_4$. As described earlier in connection with FIG. 1, switch $S_4$ remains open until such time as exposure mechanism blades 80 and 82 are fully closed. At such time as switch $S_4$ is closed, line 278 is energized from primary power line 240.

Gate input terminal *c* of GATE A is coupled through line 280 and line 282 to the corresponding common input terminal of GATE B. Their initial low status is derived as a result of the connection of line 282 through line 284 to the output 286 of a differential comparator 288. Similar to comparator 258, the output of comparator 286 is normally low and will assume a high status in response to the receipt of a signal above a predetermined triggering or threshold level at its input 290. Comparator 288 is energized from branch power line 250 through line 292 and is coupled to ground through lines 294 and 296. Representing the triggering component of the delay function described in connection with function block 172 of FIG. 4, comparator 288 serves to retain common input terminals *c* at a low state during the initial portion of a photographic cycle.

With the assertion of the above-described input logic, the resultant initial output $t_1$ of GATE A present at line 298 is high and is imposed upon the base of an NPN transistor $Q_1$. The emitter of transistor $Q_1$ is coupled alone line 300 to ground, while its collector is connected to line 302. Line 302, in turn, connects the excitation winding 252 of solenoid 114 to primary power line 240. Solenoid 114 is designated functionally in FIG. 5 by a dashed boundary. The high status at line 298 serves to forward bias the base-emitter junction of transistor $Q_1$, thereby energizing winding 252 to cause exposure mechanism 66 to block the optical path of camera 10. The output $t_2$ of GATE B is low at the commencement of a photographic cycle and is coupled through a current limiting resistor 304 and line 306 to line 302. GATE B serves a powering down function wherein solenoid 114 is energized at a lower current level when the plunger thereof gains its fully retracted position. To carry this out, GATE B diverts solenoid energizing current through limiting resistor 304. When transistor $Q_1$ is forward biased, however, this diversion through resister 304 is insignificant. The powering down feature of the control system is described and claimed in a copending application for U.S. Patent by C. H. Biber and E. K. Shenk entitled "Photographic Apparatus With Solenoid Powered Instrumentalities", Ser. No. 163,948, filed July 19, 1971 and assigned in common herewith.

Solenoid 114 being energized, blades 80 and 82 are driven to their fully closed position and when this position is reached, contacts 146 and 148 of switch $S_4$ are closed (FIG. 3). As noted at Event No. 2 of FIG. 6, the closure of switch $S_4$ alters the *b* input terminal state at line 270 from a low to a high. In consequence, as shown at Event No. 2 in FIGS. 6 and 7, the output $t_1$ of GATE A is converted to a low status, thereby reverse biasing transistor $Q_1$. As transistor $Q_1$ is turned off, energization of winding 252 is continued at a reduced current level through resistor 304 and GATE B. A change of the *b* gate input terminal state from a low to a high also alters the output $t_3$ of GATE C. While Event No. 1 is being carried out, the output $t_3$ at line 308 of GATE C is high. This high output is established as a result of a low present at line 310 and introduced to input terminal *a*. Line 310 is connected to line 254, the latter line providing a common coupling of the corresponding inputs of GATES A and B. Gate input terminal *d* of GATE C remains low in consequence of its connection through lines 312, 314 and closed switch $S_5$ to ground. Input terminal *b*, being coupled to line 278 from line 276 into switch $S_4$, alters from a low state to a high state upon the closure of switch $S_4$. The resultant low output $t_3$ of GATE C, when introduced through line 308, signals a motor control function 316 to energize motor 130. Control function 316 is energized from primary power line 240 through line 318 and is coupled to ground through line 320. As discussed in connection with function block 156 of FIG. 4, the resultant energization of motor 130 effects the release or unlatching of reflex component 50, thereby enabling its movement from its viewing-focusing position. When reflex component 50 commences to elevate, switch $S_5$ opens.

As disclosed as Event No. 3 in FIGS. 6 and 7, the opening of switch $S_5$ alters the status of input terminal *d* of GATE C to a high condition and the resultant output $t_3$ of the gate becomes high. A high status at line 308 serves to signal motor control function 316 to de-energize motor 130. As a consequence, drive to gear train 132 is halted.

The opening of switch $S_5$ and resultant alteration of the status of input terminal *d* serves to signal latching network 244 to assume its second energization state which commits the control system to the completion of a photographic cycle. Connection between input line 312 and network 244 is made through resistor 322, line 324 and line 326.

When released, reflex component 50 moves toward an abutting contact with an inwardly disposed portion of rear wall 12. As component 50 closely approaches its exposure mode position, ram 140, acting through tab 158, opens the contacts of switch $S_3$. Represented as Event No. 4 of FIGS. 5 and 6, the opening of switch $S_3$ serves to activate and an R-C timing network identified generally at 330. This network serves to impose the delay described in connection with function block 172 in FIG. 4. Formed of a timing resistor 332 and a timing capacitor 334 coupled within line 336 between ground and branch power line 250, network 330 serves to delay the commencement of exposure regulation. This delay is selected having a time constant sufficient to permit reflex component 50 to fully seat at its exposure position. Network 330 is activated upon removal of a shunt about capacitor 334 which is constituted by a line 338 connected, from a point intermediate capacitor 334 and resistor 332, to ground through a diode 340 and switch $S_3$. Diode 340 serves to isolate line 338 from spurious signals and the like.

Following an appropriate time-out of network 330, a threshold signal is developed at input 290 of comparator 288, thereby triggering the comparator to alter its output at line 286 to a high status. This high status is introduced from line 284 to lines 280 and 282 to simultaneously alter the state of all common gate inputs *c* to a high or 1 status. Such alteration changes the output $t_2$ of GATE B to a high state, thereby abruptly terminating current flow in line 302 with the consequence of de-energizing excitation winding 252 of solenoid 114. With this de-energization, blades 80 and 82 of exposure mechanism 66 commence to open under the force of spring 106. As blades 80 and 82 move from their blocking terminal position, switch $S_4$ again opens.

In addition to effecting the de-energization of excitation winding 252, the signal change in line 282 also is introduced through an inverter 342 to activate an electronic switch shown generally at 344. Described in detail and claimed in a copending application for U.S. Patent by E. K. Shenk, Ser. No. 213,289 entitled "Exposure Control System Incorporating Solid State Switching to Enable a Light Sensitive Network", filed and assigned in common herewith, when triggered, switch 344 removes a shunt established by lines 346 and 348 across a timing capacitor 350. The removal of this shunt activates exposure control network 268, thereby providing the exposure monitoring function described in connection with function block 176 of FIG. 4 and identified as Event No. 5 in FIGS. 6 and 7.

Network 268 includes a photovoltaic cell 352, positioned within camera 10 behind openings 88 and 90 of exposure mechanism 66, and connected to the input of an operational, differential type amplifier 354 by lines 356 and 358. Timing capacitor 350 is coupled within a feedback path between the output 360 of amplifier 354 and its input at line 356.

Described in greater detail in a copending application for U.S. Patent by J. P. Burgarella, U.S. Pat. No. 3,620,143, entitled "Automatic Exposure Control System with Fast Linear Response", the output of this light sensing arrangement at line 360 represents an integrated valuation of scene lighting as witnessed at the optical path of camera 10. This output is varied in accordance with the sensitometric properties of film being exposed by a second amplification stage 362. Amplification stage 362 operates in conjunction with a gain adjusting variable resistor 364 and a calibrating resistor 366, the latter being positioned within a feedback path line 368. The noted film speed and calibration adjustment of the output at 360 is described in greater detail and claimed in a copending application, now U.S. Pat. No. 3,641,891.

Note that power supplies for both amplifiers 354 and 362 are provided from branch power line 248 and line 370, while ground connections for the amplifiers, respectively, are provided through lines 372 and 374.

The adjusted output from network 268 is presented along line 266 to differential comparator 258. When the signal value at line 266 reaches the threshold or trigger level of comparator 258, the output thereof at line 256 converts from a low to a high state. This conversion is represented in FIGS. 6 and 7 as operational Event No. 6. As displayed in those figures, the resultant high output at line 256 alters the status of common gate input terminals *a* to a corresponding high status. The resultant outputs of GATES A and B are converted. For instance, output $t_1$ of GATE A is changed to a high status and output $t_2$ of GATE B is changed to a low status. A high output at line 298 serves to forward bias the base-emitter junction of transistor $Q_1$, thereby energizing solenoid winding 252 from line 302, in turn, causing solenoid 114 to block the optical path of camera 10 by closing blades 80 and 82. This action, as described in connection with function block 178 of FIG. 4, terminates an exposure interval.

As switch $S_4$ is closed with the closure of exposure mechanism blades 80 and 82, the status of input terminals *b* at GATES A and C convert from a high to a low state. The resultant change of the output $t_1$ of GATE A to a low status serves to turn off transistor $Q_1$. The earlier described power-down function performed by GATE B continues the energization of winding 252 at a lower current level.

As tabulated and displayed at Event No. 7 in FIGS. 6 and 7, the change of status of input terminals *b* also changes the output $t_3$ of GATE C to a low status, thereby activating motor control function 316 to, in turn, energize motor 130. As discussed in connection with function blocks 200 and 202 of FIG. 4, when thus energized, motor 130 rotates cycle phase cam 136 to drive ram 140 rearwardly, thereby cocking or returning reflex component 50 to its viewing-focusing position. In the course of this movement, pick assembly 190 is actuated to draw a photographic unit 34 from cassette 32 and move its forward edge into the bite of rotating processing rolls 184 and 186 to process the unit and/or drive it out of the receiving chamber of camera 10.

As reflex component 50 is driven from its exposure position, switch $S_3$ is closed, thereby reactivating the shunt imposed by line 338 about timing capacitor 334. The output of differential comparator 288 returnS to a low status to, in turn, change the state of common gate input terminals *c* to a low status.

When reflex component 50 is seated in its viewing-focusing position, tab 158 of ram 140 recloses switch $S_5$ by urging leaf 160 into contact with leaf 162. Displayed as Event No. 8 in FIGS. 6 and 7 and discussed in connection with function block 204 of FIG. 4, this switching action changes the condition of gate input terminal *d* from a high to a low status to, in turn, change output $t_3$ at line 308 to a high status, thereby signaling motor control function 316 to stop motor 130.

When finally closed, switch $S_5$ imposes a quenching signal to latching function 244 from along lines 314, 312, 324 and 326. As a consequence, the entire circuit is de-energized, thereby effecting the de-energization of excitation winding 252 of solenoid 114. The latter de-energization permits exposure mechanism blades 80 and 82 to be driven under the bias of spring 106 to their fully open position in preparation for a next succeeding photographic cycle.

Control Circuit — Flash Mode

Figure 9:
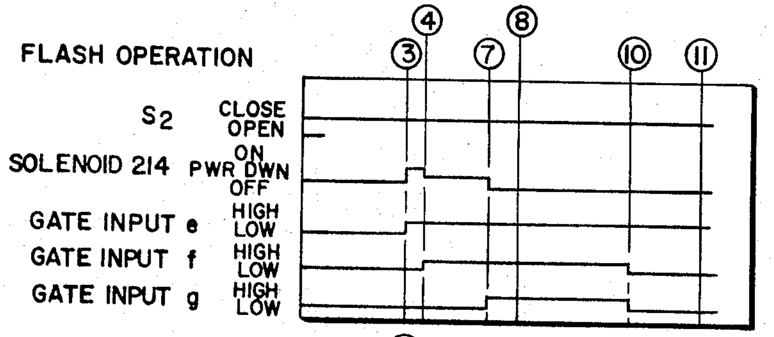
FIG. 9 is an energization status chart for various components of the circuit of FIG. 5 as they operate in a flash mode.

The control system of camera 10 converts to a follow-focus type flash operation upon the insertion of multilamp flash assembly 210 into its mounting within exposure housing 16. When so inserted, the assembly 210 effects the closure of a switch $S_2$ connected within line 324. When closed, switch $S_2$ serves to activate the flash control logic of the circuit of FIG. 5, as discussed in connection with function block 212 of FIG. 4. Referring additionally to FIGS. 8 and 9, it may be seen that, at the commencement of a photographic cycle under flash operation, Event No. 1 remains the same as operation under ambient conditions. Accordingly, input conditions are imposed upon GATES A and B so as to effect the energization of excitation winding 252 of solenoid 114. As noted at function block 154 of FIG. 4, blades 80 and 82 of exposure mechanism 66 are driven to a blocking terminal position effecting the closure of switch $S_4$. Simultaneously, the input terminals to GATE C are selectively converted to establish a low at output $t_3$, thereby causing motor control 316 to energize motor 130. As reflex component 50 commences to elevate, switch $S_5$ is opened and, as in the case for ambient operation, latching network 244 assumes its second energization state, assuring the completion of a photographic cycle. The status of input terminal *d* of GATE C converts to a high condition. As a consequence, the output $t_3$ of GATE C becomes high, serving to signal motor control function 316 to de-energize motor 130.

As shown at Event No. 2 of FIGS. 8 and 9, the opening of switch $S_5$ also permits the assertion of a high signal from power distribution line 246 through line 324, closed switch $S_2$, line 376 and line 378 to common input terminal *e* of GATES E and C. Line 324 is connected to power line 246 through a limiting resistor 380 and, through a level setting resistor 382 and switch $S_2$, to ground. Prior to the opening of switch $S_5$, input terminals *e* retain a low state, inasmuch as the high signal otherwise derived from power line 246 is diverted along line 312 and switch $S_5$. Common input terminals *a* of GATES D and E remain low throughout the initial portions of a photographic cycle in consequence of their connection, respectively, from lines 384 and 386 to line 310. As described earlier, line 310 interconnects common input terminals *a* of GATES A, B and C. Input terminal *f* of GATE D remains low in consequence of its connection through line 388, line 390, diode 392 and a closed switch $S_3$ to ground. Line 390 is connected between branch power line 250 and ground and includes a level setting resistor 394 above its connection with line 388 to permit the desired initial low status at input terminal *f*. Diode 392 serves to accommodate spurious signals or the like generated in operation of switch $S_3$.

Input terminal $g$ of GATE E retains an initial low status as a result of its connection along line 396 to an output of a flash control function depicted generally at 400. Control 400 includes appropriate circuitry for effecting the sequential firing of individual bulbs within the multilamp flash unit, as well as for providing select delay functions utilized in effecting the energization and the de-energization of excitation winding 252 of solenoid 114. These operations have been discussed in connection with function blocks 228, 230 and 232 of FIG. 4. Flash control 400 is coupled with branch power line 250 through line 402 and, to ground, through line 404.

Prior to the opening of switch $S_5$, the initial conditions present at the input terminals of GATES D and E derive a low state $t_4$ on output line 406 of GATE D. The corresponding output $t_5$ at line 408 of GATE E is high. Output line 406 is connected with the base of an NPN transistor $Q_2$. The emitter of transistor $Q_2$ is connected through line 410 to ground, while its collector is coupled through lines 412 and 414 through the excitation winding 416 of solenoid 214 (shown in FIG. 5 as a dashed boundary) to primary power line 240. Output line 408 of GATE E is connected, through a current limiting resistor 418 present in line 412, to line 414.

Under the initial output conditions described, the low state of output $t_4$ serves to reverse bias transistor $Q_2$, thereby isolating line 414 from ground. Similarly, the high status of output $t_5$ also prevents current passage through line 414. Accordingly, the excitation winding 416 of solenoid 214 remains inactive until such time as switch $S_5$ is opened.

When switch $S_5$ opens, a high signal is imposed along lines 376 and 378 to common input terminals $e$ of GATES E and D. As a result, output $t_4$ of GATE D becomes high, thereby forward biasing transistor $Q_2$ to permit current flow through line 414 and effect energization of excitation winding 416. Output $t_5$ of GATE E converts to a low state, also permitting current flow through line 414. However, as a result of the presence of current limiting resistor 418, the value of such current is dismissable. The resultant energization of solenoid 214, as described in connection with function block 216 of FIG. 4, effects the positioning of interceptor linkage 218 at a location providing for establishing a focus-responsive aperture opening.

As reflex component 50 continues its upward movement, ram 140 effects the opening of switch $S_3$, thereby activating R-C delay network 330 by deactivating shunt line 338. Delay network 330 functions identically for both flash operation and ambient operation, as described in connection with function block 172 of FIG. 4. The noted opening of switch $S_3$ also permits the imposition of a high signal from lines 390 and 388 into input terminal $f$ of GATE D. The resultant input alteration changes output $t_4$ from a high to a low state. As a consequence, transistor $Q_2$ is reverse biased and energizing current for excitation winding 416 of solenoid 214 is diverted through a path including current limiting resistor 418 and output line 408 of GATE E. As a consequence, winding 416 is energized at a lower current level so as to conserve energy available from battery 46.

When R-C network 330 attains the requisite threshold triggering level of comparator 288, the output thereof at 286 converts from a low state to a high state. As shown at Event No. 5 in FIGS. 8 and 9 and, as described earlier in connection with ambient operation, the low state at output 286 serves to convert common input terminals $c$ of GATES A and B to a low state to, in turn, change output $t_2$ of GATE B to a high state, thereby deenergizing excitation winding 252 of solenoid 114. Exposure mechanism blades 80 and 82 are released for movement toward their open terminal position as described in connection with function block 174 of FIG. 4. The low state at output 286 also serves to signal flash control 400 from line 284 to commence the delay discussed earlier in connection with function block 228 of FIG. 4. This delay is selected in accordance with the amount of time required for blades 80 and 82 to achieve their terminal open positions, however, the blades are captured at an appropriate focus responsive setting by interceptor link 218.

Switch $S_4$ opens as blades 80 and 82 leave their blocking terminal position to convert common input terminals $b$ from a high state to a low state as shown at Event No. 6 of FIGS. 8 and 9. Flash control 400 also serves to inactivate exposure control network 268 by maintaining electronic switch 334 in a condition preventing removal of the earlier described shunt about timing capacitor 350. The signal providing for this inactivation is inserted from along line 420.

At the conclusion of the delay described at function block 228, flash control 400, acting ghrough line 396, alters the condition of input terminal $g$ of GATE E from a low to a high state. This change alters output $t_5$ from a low state, permitting the energization of excitation winding 416, to a high state deenergizing solenoid 214. With this deenergization, a fly-back pulse is generated from winding 416 which is witnessed at line 426 and introduced to flash control 400. Control 400, in turn, ignites a select one of the flashbulbs within flash assembly 210. An electronic arrangement for providing a sequential flash firing system responsive to such pulse generation is claimed and described in U.S. Pat. No. 3,699,861.

Following a fixed delay selected in accordance with the output characteristics of the ignited flashbulb, as described in connection with function block 232 of FIG. 4, flash control 400 inserts a threshold level signal to differential comparator 258 from along 428. This signal converts the output at line 256 of comparator 258 to a low state, thereby causing the control system to progress through the remainder of a photographic cycle in identical fashion as carried out for ambient operation. The conclusion of the photographic cycle is depicted in connection with Event Numbers 8–11 of FIGS. 8 and 9 as well as in connection with function blocks 178, 200, 202 and 204 of FIG. 4.

DARK SLIDE EJECTION CYCLE

When a film cassette 32 is inserted within an empty receiving chamber of camera 10, an uppermost photographic unit 34 such as dark slide 44 is automatically removed when the receiving chamber is manually secured. Referring to FIG. 4, the operations adjusting the control system to operate in such manner are shown in block logic form. For instance, the insertion of a cassette 32 into the receiving chamber of camera 10 is depicted at function block 436, while the manual procedure of closing and latching a loading door to secure the receiving chamber of camera 10 is depicted at function block 438.

Insertion of a fresh cassette as shown at block 436 also serves to enable a feature wherein no flashlamp within flash assemblage 210 will be fired during the automatic removal of uppermost photographic unit 34. This feature is depicted at function block 440.

Following closure and latching of the loading door of camera 10, the control system is automatically started without recourse to depressing start button 144. The control system then continues a normal cycle as described earlier in connection with function blocks 154, 156 and 172. However, prior to delay 172, the automatic ejection feature inserts a post exposure logic as depicted at function block 444. This logic insertion serves to substantially override the operational events described earlier in connection with function blocks 174, 176 and 178. Accordingly, just prior to the timeout of delay 172, the photographic cycle continues with removal and processing of uppermost photographic unit, as depicted in function block 200, as well as cocking reflex component 50, as depicted in function block 202. When a film unit 34 is removed and reflex component 50 is cocked, the control system shuts down or quenches and effects the opening of exposure mechanism blades 80 and 82, as depicted at function block 204.

Dark Slide Ejection Cycle — Counter Mounted Switching

Two switches $S_6$ and $S_7$ are utilized, respectively, for purposes of enabling and actuating the automatic dark slide removal feature of the invention. One of these switches, $S_6$, is positioned within a rear corner of base 18 and is actuated in conjunction with insertion and removal of a cassette 32 within the receiving chamber of camera 10. Switch $S_6$ operates in conjunction with the operation of a counter mechanism indicated generally at 446. Described in U.S. Pat. No. 3,653,313, counter 446 includes a compound ratchet wheel 448, the outer periphery of which supports printed indicia indicating the number of exposures available in camera 10 as well as a status wherein no cassette 32 is properly present within the noted receiving chamber. The latter status is depicted by the letters "DS".

Mounted upon a supporting bracket 450 secured to inner frame 30, wheel 448 additionally is formed having drive and release ratchets shown respectively at 452 and 454. Release ratchet 454 is configured for operation in conjunction with a no-back pawl 456 which is biased by a spring 458 (FIG. 13) such that its tipped portion 460 is urged into engagement with succeeding teeth of ratchet 454. Drive ratchet 452 is configured for operation in conjunction with a drive pawl 462 which is pivotally attached at axle 464 to the rearward edge of reflex component 50. Drive pawl 462 is biased by a spring 466 to assure positive engagement with succeeding ones of teeth of drive ratchet 452 when reflex component 50 is driven from its exposure mode position into its viewing-focusing position during a cocking procedure. Pawl 462 also includes a cylindrical tab 468 and a tooth engaging tip portion 470.

Figure 12:
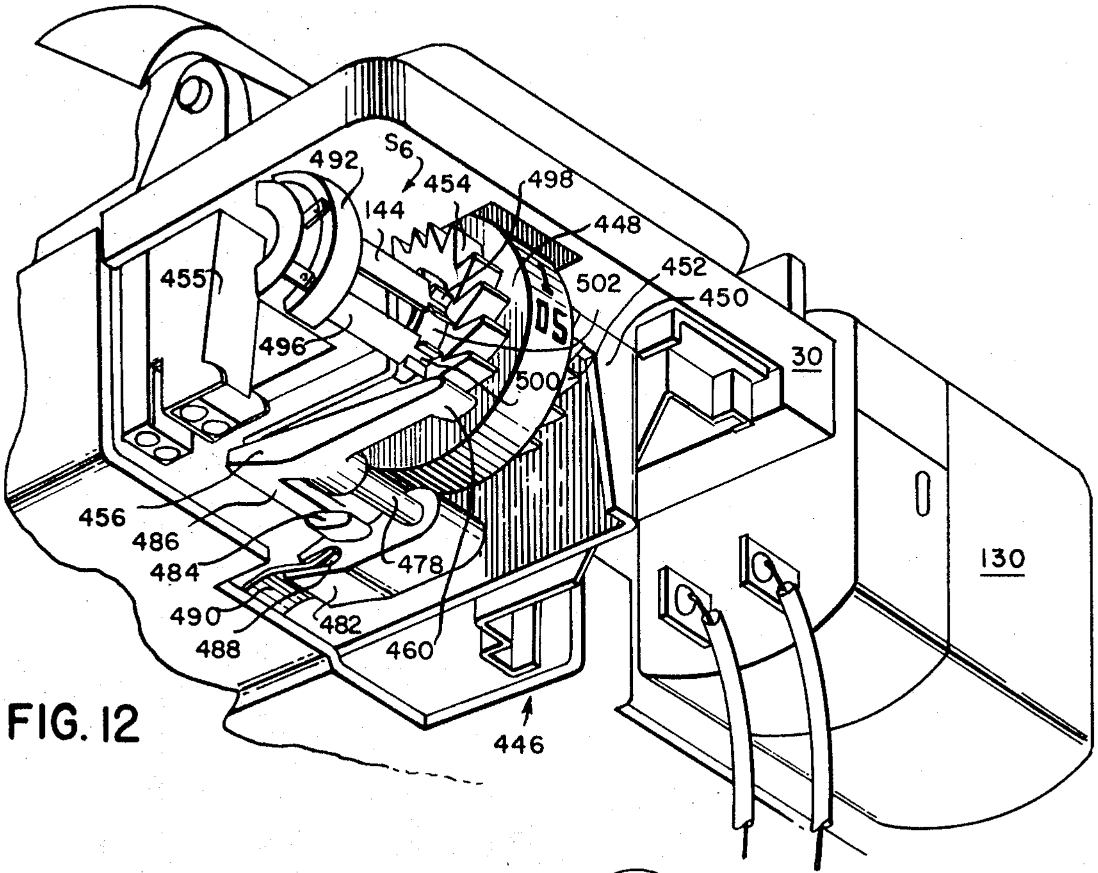
FIG. 12 is a partial, pictorial representation of a counter mechanism incorporated within a rearward portion of the camera of FIG. 1.
Figure 13:
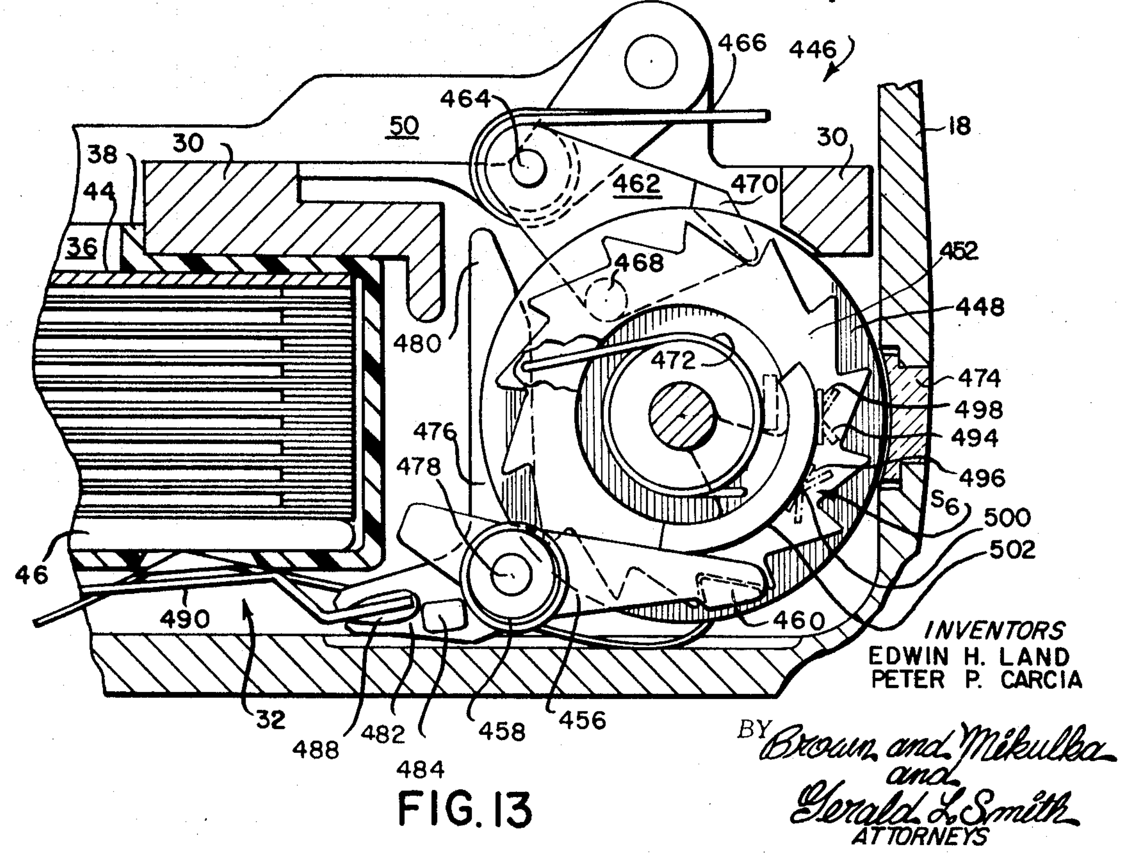
FIG. 13 is a partial side sectional view of the camera of FIG. 1 as taken through the counter mechanism of FIG. 12.

With the above combination of components, as reflex component 50 is driven downwardly, tip 470 of pawl 462 engages a tooth of drive ratchet 452, thereby rotating wheel 448 in a clockwise direction as viewed in the sense of FIGS. 12 and 13. During this rotation, a spirally wound spring 472 having one end coupled with wheel 448 and the other with bracket 450 is incrementally wound. When reflex component 50 closely approaches its viewing-focusing mode position, the tip 460 of no-back pawl 456 engages an appropriate one of the teeth of release ratchet 454 to hold wheel 448 in position against the bias imparted from spring 472. Following cocking procedures, an appropriate indicia on the face of wheel 448 can be viewed through a transparent window 474 (FIG. 13) formed in the rearward surface of base 18.

Counter mechanism 446 also includes a reset pawl 476 mounted copivotally with no-back pawl 456 upon an axle 478 supported from bracket 450. Reset pawl 476 is formed having a drive pawl release stem 480 extending upwardly in position for selective engagement with cylindrical tab 468 of drive pawl 462. Pawl 476 also is formed incorporating an actuator arm 482 extending forwardly from its connection with axle 478 and a drive flange 484 extending from arm 482 in a manner wherein it is selectively contactable with an extension 486 of no-back pawl 456. Actuator arm 482 is slotted at 488 in a manner permitting it to receive the tip of a sensing member present as a spring 490, the stationary end of which is fixed to the bottom of base 18.

As evidenced in FIG. 13, when a cassette 32 is properly positioned within the receiving chamber of camera 10, spring 490, which is biased for movement upwardly, is moved toward the bottom of base 18. This movement is transferred through actuator arm 482 to orient resent pawl 476 in a position wherein flange 484 does not contact extension 486 of no-back pawl 456 and wherein stem 480 does not contact tab 468 of drive pawl 462.

When cassette 32 is removed from the receiving chamber of camera 10, spring 490 elevates, thereby pivoting reset pawl 476 about axle 478. Thus pivoted, stem 480 contacts tab 468 of drive pawl 462 to rotate tip portion 470 thereof out of engagement with the teeth of drive ratchet 452. Simultaneously, drive flange 484 contacts extension 486 of no-back pawl 456 to drive tip 460 of the latter out of engagement with the teeth of release ratchet 454. As a consequence, wheel 448 is rotated in a counterclockwise direction under the bias of spring 472 until a stop member (not shown) halts the wheel at an orientation wherein the indicia DS appears at window 474.

Switch $S_6$ is formed having an insulative base 492 supported by bracket 450. Base 492 supports two resilient switch leaves 494 and 496, the outer tip portions of which are shown respectively at 498 and 500. Tip portions 498 and 500 are formed as wiper surfaces. Wiper surfaces 498 and 500 are arranged for slidable engagement with a semi-circular commutator surface 502 mounted upon wheel 448 outwardly of release ratchet 454. Surface 502 is configured of such length as to electrically join leaves 494 and 496 only at such time as indicia DS is visible through window 474, thereby assuring that switch $S_6$ is closed only at such time as a cassette 32 is newly inserted in the receiving chamber of camera 10.

Dark Slide Ejection Cycle — Loading Door Switching

Figure 15:
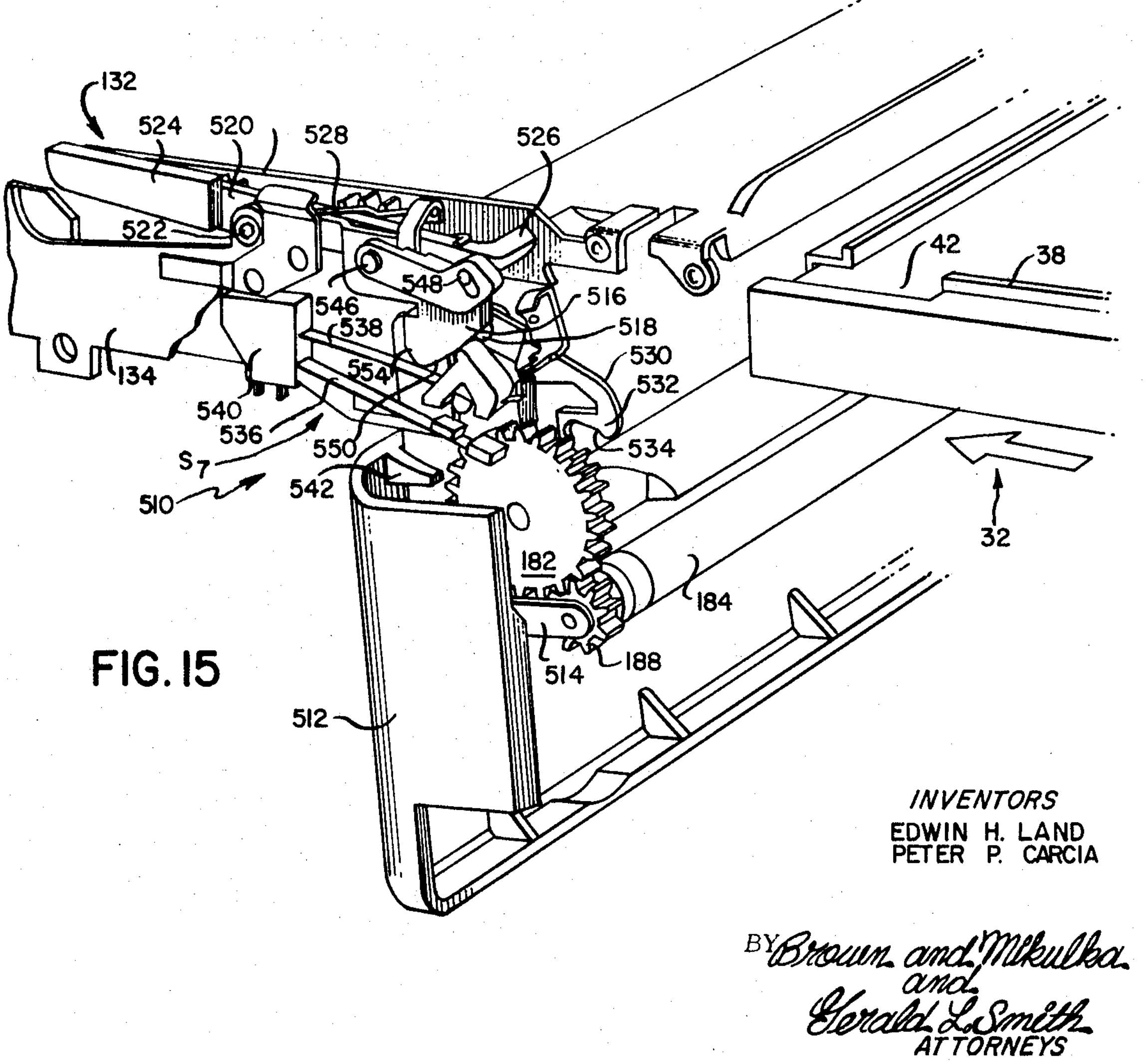
FIG. 15 is a partial perspective view of a forward portion of the camera of FIG. 1 showing a loading access door in an open position, the view having portions broken away to reveal internal structure.

The second switch within the automatic dark slide removing feature of the control system operates in conjunction with a loading door which is movable to grant access to the noted receiving chamber of camera 10. Referring to FIGS. 14 and 15, the forward portion of camera 10 is revealed in enhanced detail to display a loading access door shown generally at 510. Loading door 510 includes an outer cover 512 which is attached at its innerside to the lowermost portion of a hinge bracket 514. The forward portion of bracket 514 supports processing station components including rolls 184 and 186 along with drive pinion 188 and a spur gear 182. The rearward extension of bracket 512 is configured as a hinge arm 516 which is pivotally coupled to inner frame 30 at a hinge pin 518 fixed to and extending therefrom. Thus, pivotally connected to inner frame 30, loading door 510 can be manually manipulated from the closed or securing position shown in FIG. 14 to the open position shown in FIG. 15 which provides access for directly inserting a cassette 32 in the general direction shown by the arrow.

When in the closed or securing position of FIG. 14, loading door 510 is locked by a manually actuated latch 520. Latch 520 is pivotally mounted upon an axle 522 extending between inner frame 30 and outer plate 134. The latch is formed having a finger engageable extension 524 positioned on one side of axle 522 and a latching tip 526 formed oppositely therefrom. A spring, a portion of which is shown at 528, is connected between latch 520 and outer plate 134 in a manner biasing latching tip 526 in a downward direction.

Latching tip 526 is configured to slidably engage with the cam surface 530 of a latching extension 532 in hinge bracket 514. For instance, as loading door 510 is pivoted about hinge pin 518 toward the latched position of FIG. 14, latching tip 526 engages cam surface 530 and is gradually elevated until such time as it is driven downwardly by spring 528 to engage within latching recess 534 formed within extension 537. In that position, shown in FIG. 14, loading door 510 is in a locked or securing position.

Switch $S_7$ operates in conjunction with the movement of loading door 510 to and from the noted securing or locked position. The switch is configured having two resilient leaves 536 and 538 which extend from and are supported by an insulative base 540 fixed to outer plate 134.

As is described in detail and claimed in a copending application for U.S. Patent by R. Paglia, Ser. No. 213,316, entitled "Photographic Apparatus With Delayed Interlock Switch", filed Dec. 29, 1971 and assigned in common herewith, now abandoned in favor of continuation application Ser. No. 279,026, filed Aug. 9, 1972, switch $S_7$ is actuated such that the contacts of leaves 536 and 538 are electrically joined only after loading door 510 is latched or locked in its closed position. In this regard, outer cover 512 is formed incorporating a camming stud 542 which is configured and positioned to selectively engage lower leaf 536 as loading door 510 is moved toward its locked position. As door 510 reaches this position, stud 542 will have positioned leaf 536 at a predetermined point of contact.

Similarly, as door 510 is moved toward its locked position, cam surface 530 engages latching tip 526 to drive it upwardly substantially throughout the entire closing movement of door 510. As tip 526 is driven upwardly, a switching cam 544 pivotally connected at 546 to outer plate 134 and to latch 520 at 548 is rotated in a counterclockwise direction in the sense of FIGS. 14 and 15. This rotation initially moves a cam dwell surface 550, formed within switching cam 544, across the contacting tip of an insulative follower 552 fixed to the outer edge of swtich leaf 538. As loading door 510 closely approaches its locked position, a rapid rise portion 554 of switching cam 544 is moved across follower 552 to cause leaf 538 to elevate. When latching tip 526 of latch 520 is driven into latching recess 534 of hinge bracket 514, rotation of switching cam 544 is reversed to drive follower 552 and upper leaf 538 into switching contact with lower leaf 536. The reverse rotation of switching cam 544 continues to an extent whereby follower 552 maintains switching contact between leaves 538 and 536 when in contact with a central portion of dwell surface 550.

Dark Slide Ejection Cycle — Circuit

Figure 11:
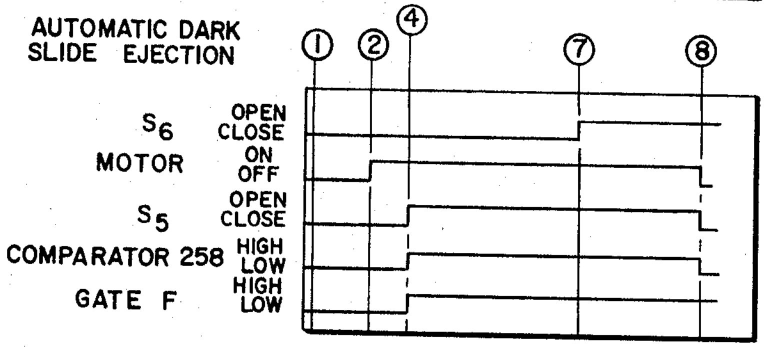
FIG. 11 is an energization status chart for various components of the circuit of FIG. 5 as they operate to effect automatic dark slide performance.

Turning to FIGS. 5, 10 and 11, the circuit components operating in conjunction with the actuation of switches $S_6$ and $S_7$ are illustrated.

When the receiving chamber of camera 10 is empty, counter wheel 48 is in the earlier described DS orientation wherein switch $S_6$ is closed. Switch $S_6$ is coupled within line 560 extending between primary power line 240 and input terminal *h* of GATE F. Line 560 also is connected to line 562 which, in turn, extends to the base of an NPN transistor $Q_3$. The emitter of transistor $Q_3$ is coupled to ground through line 564, while its collector is coupled through line 566 to line 324 as it extends from switch $S_2$ to resistor 382. With the arrangement shown, when power is applied to primary power line 240 from battery 46 and switch $S_6$ is closed, a high signal is imposed across the base-emitter junction of transistor $Q_3$ to render it forwardly biased. When so forwardly biased, transistor $Q_3$ isolates the function of switch $S_2$ by drawing line 376 as well as flash control enabling line 328 to ground. As a consequence, the flash operation of the control system is automatically deactivated. This feature of the control system is generally described in connection with function block 440 of FIG. 4.

When a cassette 32 is inserted within an empty receiving chamber of camera 10, a battery 46 correspondingly is inserted to supply energy to power line 240, switch $S_6$ is closed and, upon closure of loading door 510, switch $S_7$ is closed. Under a condition wherein both switches $S_6$ and $S_7$ are closed, a signal is introduced into latching function 244 to cause it to assume its earlier described first energization state. Further, as described in connection with function block 442 of FIG. 4, when latching function 244 assumes the noted first energization state, without recourse to closing switch $S_1$, an automatic start function is realized, the camera operator needing only to insert a cassette 32 and close loading door 510. The noted signal input to latching function 244 is provided from along line 568 and it may be seen that switch $S_6$ is, in effect, in parallel relationship with switch $S_1$. As noted at Event No. 1 of FIGS. 10 and 11, with the activation of latching function 244, outputs $t_1$ through $t_5$ of respective GATES A through E assume electrical states identical to those assumed at the commencement of a photographic cycle in ambient operation. Accordingly, as shown at function block 154 of FIG. 4, exposure mechanism blades 80 and 82 are driven to a closed position by solenoid 114 and the exposure chamber 28 is secured.

During the interval of energization of solenoid winding 252, input terminal *h* of GATE F assumes a high status by virtue of its connection along line 570 to activated line 560. Input terminal *b* is held at a low state by virtue of its connection from line 572 to common gate connecting line 276. Input terminal *d* of GATE F is held at a low status as a consequence of its connection along line 574 to lines 312, 314 and closed switch $S_5$ to ground. With the noted input conditions at GATE F, its corresponding output $t_6$ at line 576 is held in a low condition. Line 576 connects with the input of differential comparator 258 and when altered to a high status, serves to insert a threshold signal therein to trigger its output from a low to a high state.

As exposure mechanism blades 80 and 82 reach their closed position, as set forth as Event No. 2 in FIGS. 10 and 11, output $t_1$ of GATE A is changed from a high state to a low state as a result of the lateration of common input terminal *b* from a low state to a high state. Winding 252 of solenoid 114 now retains plunger 118 in its retracted position with a diminished current value as established by limiting resistor 304 coupled with the output of GATE B. Alteration of common gate input *b* is also witnessed at GATE F from line 572 and at GATE C from line 276. While the output $t_6$ of GATE F is not altered, that of GATE C at line 308 is changed from a high to a low state. As a consequence, motor control 316 turns on motor 130.

As described in connection with function block 156 of FIG. 4, a resultant driving of gear train 132 effects the release of reflex component 50 for movement toward its exposure position and its initial movement serves to open switch $S_5$. When switch $S_5$ is opened, input terminal *d* of GATE C not only is altered from a low to a high state, but also the corresponding input terminal *d* of GATE F. The latter alteration at the input of GATE F changes its output $t_6$ at line 576 from a low to a high. This high signal is impressed along line 576 into the input of comparator 258. As a consequence, comparator 258 signals both GATES A and B from both lines 256 and 254 to energize excitation winding 252 of solenoid 114. In effect, the control system has operated under "zero" exposure conditions, i.e., the sequence of operational events now includes the insertion of post exposure logic as described in connection with function block 444 of FIG. 4. Accordingly, the command at common gate input *d* of GATE C is overridden by the command of comparator 258 to terminate an exposure.

As shown at Event No. 4 of FIGS. 10 and 11, GATE C receives a high status command at common input terminal *a* to cause motor control 316 to continue energization of motor 130.

As reflex component 50 continues to rise under spring drive, switch $S_3$ is opened as noted at Event No. 5 of FIGS. 10 and 11. As a consequence, timing network 330 commences to impose the delay described in connection with function block 172 in FIG. 4. When comparator 288 is tripped at the termination of the noted delay, output line 286 assumes a low state, however, the resultant imposition of this signal at common gate inputs *c* of GATES A and B does not alter the status of outputs $t_1$ and $t_2$. Excitation winding 252 of solenoid 114 remains energized and the optical path of camera 10 remains blocked.

Even though motor 130 is operated as reflex component 50 is being driven upward toward its exposure position, the component 50 will continue until it substantially reaches its seated location. However, by virtue of the energization of motor 130, component 50 is immediately driven to its initial viewing-focusing mode position. During the latter actuation, as noted at Event No. 6 of FIGS. 10 and 11, switch $S_3$ is reclosed. As in the case of ambient performance, the closure of switch $S_3$ during cocking procedures has no effect upon shutter controlling GATES A or B or upon motor controlling GATE C. Accordingly, blades 80 and 82 remain closed and motor 130 continues to run.

During the ensuing cocking procedure, pick assembly 190 is activated to withdraw an uppermost photographic unit 34, which may be dark slide 44, and move it into the bite of processing rolls 184 and 186. As a consequence, the photographic unit 34 is removed from the camera as noted at function block 200 of FIG. 4.

As reflex component 50 closely approaches its seated, viewing-focusing position, drive pawl 462 of counter mechanism 446 (FIGS. 12 and 13) indexes wheel 448 by rotating it one predetermined increment. Such rotation removes wiper tip 498 of switch $S_6$ leaf 494 from contact with commutator 502. Switch $S_6$ opens and input terminal *h* of GATE F alters from a high state to a low state. In consequence, output $t_6$ at line 576 changes to a low state. However, inasmuch as comparator 258 retains its triggered status until the completion of a photographic cycle, no alteration is made to the outputs $t_1$ and $t_2$ of GATES A and B.

When reflex component 50 is fully seated at its viewing-focusing position, switch $S_5$ is closed as noted at Event No. 8 of FIGS. 10 and 11. Closure of switch $S_5$ functions as described in connection with ambient performance of the system to quench or close down the circuit and terminate a photographic cycle. With the noted deenergization, winding 252 of solenoid 114 is deenergized, thereby permitting blades 80 and 82 of exposure mechanism 66 to assume their fully open positions.

Returning to FIG. 13, an interesting feature of the control arrangement of the invention is shown to reside in the earlier noted provision of a battery 46 at the bottom of each cassette structure 32. The terminals of battery 46 are accessible through selectively spaced holes as at 428 formed in the bottom cover of cassette 32 when cassette 32 is properly inserted within the receiving chamber defined by inner frame 30, spring biased contact members as at 430 fixed to the bottom of base 18 move through holes 428 to provide electrical connection with battery 46. Accordingly, camera 10 cannot be cycled automatically or otherwise unless a cassette is properly positioned therewithin. This feature also assures that the automatic dark slide ejection function will not be activated unless cassette 32 is properly in place. Further, because automatic actuation for purposes of dark slide removal is fully automatic, removal of a cassette 32 permits storage of camera 10 in an erected orientation without causing a continued actuation of the automatic dark slide removal feature.

Since certain changes may be made in the above described system and apparatus without departing from the scope of the invention herein involved, it is intended that all matter contained in the description thereof or shown in the accompanying drawings shall be interpreted as illustrative and not in a limiting sense.

What is claimed is:

1. Photographic apparatus for use with a cassette configured to retain photographic units in an arrangement for presentation at at exposure station, comprising:

a housing having receiving means for removably positioning a said cassette in a predetermined location with respect to said exposure station, said receiving means further including loading access means movable to a given position for securing said cassette at said predetermined location;

exposure means for controllably exposing photosensitive ones of said photographic units to light from a scene;

driven instrumentality means actuable to remove select ones of said photographic units from a said cassette when positioned at said predetermined location within said receiving chamber means; and control means for selectively actuating said driven instrumentality means in response to said positioning of said cassette in said predetermined location and including actuator means responsive to said movement of said loading access means into said given position for initiating said select driven instrumentality means actuation.

2. The photographic apparatus of claim 1 wherein said control means includes:

means for monitoring the status of photographic units within a said cassette; and switch means responsive to a predetermined condition of said monitoring means for enabling said control means to automatically actuate said drive means.

3. The photographic apparatus of claim 2 wherein said exposure means includes:

circuit means responsive to a predetermined input signal for effecting the blocking of an optical path to terminate a said exposure of a said photographic unit; and said control means includes gate means for selectively inserting said predetermined signal into said circuit means when enabled by said switch means.

4. The photographic apparatus of claim 2 wherein said exposure means includes:

means defining an optical path, and means for selectively blocking and unblocking said optical path to effect a photographic exposure; and said control means is operative to command said exposure means to block said optical path when said driven instrumentality means is automatically actuated.

5. The photographic apparatus of claim 2 in which:

said exposure means includes means for selectively generating a signal to activate a source of artificial illumination; and said control means is operative automatically to suppress said generation when said drive means is automatically actuated.

6. The photographic apparatus of claim 2 wherein:

said loading access means includes door means movable into said closed position for securing a said cassette within said receiving means, and latch means movable into latching engagement with said door means for retaining said door means at said closed position; and said control means includes switch means actuable in response to said latch means movement into said latching engagement for effecting said automatic driven instrumentality means actuation.

7. Photographic apparatus for use with containers for photosensitive material, said containers having a light entrance portion through which said material may be exposed and a removable cover opaque to actinic radiation positioned to prevent the passage of said radiation through said entrance portion prior to the photographic use of said material, comprising:

a housing;

exposure means mounted with said housing for controllably exposing said material to light from a scene;

receiving chamber means within said housing for removably retaining a said container at a predetermined position suited for effecting a said exposure through said light entrance portion, said receiving chamber means including loading access means movable to a given position for securing said container at said predetermined position;

driven instrumentality means actuable to engage with and remove said cover from said position preventing the passage of actinic radiation through said light entrance portion; and control means for actuating said driven instrumentality means automatically in response to said reception and said securing of said container within said receiving chamber means.

8. The photographic apparatus of claim 7 in which:

said control means includes actuator means responsive to movement of said loading access means into said given position for initiating said driven instrumentality means automatic actuation.

9. The photographic apparatus of claim 7 in which said control means includes means positioned within said receiving chamber means and responsive to the removal of a said container from said receiving chamber means for enabling said control means to effect said automatic actuation of said drive means when a said container is next positioned within said receiving chamber means.

10. The photographic apparatus of claim 7 in which:

said receiving chamber means loading access means is movable to a latched position for securing said container at said predetermined position; and said control means includes means positioned within said receiving chamber means and responsive to a removal of a said container therefrom and a subsequent insertion of a said container thereinto for enabling said control means tO carry out said driven instrumentality means automatic actuation, and actuator means responsive to movement of said loading access means to said latched position for initiating said driven instrumentality means actuation.

11. The photographic apparatus of claim 7 in which:

said exposure means includes means selectively generating a signal for activating a source of artificial illumination; and said control means is operative automatically to suppress said signal generation when said driven instrumentality means is automatically activated in response to the said reception of a said container.

12. The photographic apparatus of claim 7 in which said control means is operative to prevent a said controlled exposure means exposure when said driven instrumentality means is activated automatically in response to the said reception of a said container within said receiving chamber means.

13. The photographic apparatus of claim 7 in which said control means includes:

counter means having at least one element movable from an initial position corresponding with the presence of a said cover within a said container for monitoring a predetermined sequence of said exposures of said photosensitive material within said container; and switch means responsive to the position of said element and having a unique circuit condition when said element is in said initial position for enabling said control means to effect said automatic actuation of said driven instrumentality means.

14. The photographic apparatus of claim 13 in which:

said receiving chamber means loading access means is movable to a latched position for securing said container at said predetermined position; and said control means includes interlock switch means responsive to and having a unique circuit condition when said loading access means is at said latched position for initiating said drive means automatic actuation.

15. The photographic apparatus of claim 13 in which:

said exposure means includes means to selectively generate a signal for activating a source of artificial illumination; and said control means is operative to suppress said signal generation when said switch means has said unique circuit condition.

16. Photographic apparatus, for use with cassettes configured to contain photographic units in an arrangement presenting a select one of which at an exposure station, comprising:

a housing having receiving chamber means for removably positioning a said cassette at a predetermined location with respect to said exposure station;

access means movable to a given position for securing said cassette within said receiving chamber means;

exposure means for controllably unblocking and blocking an optical path to expose photosensitive ones of said photographic units to light from a scene;

driven instrumentality means actuable to remove a said select one of said photographic units from a said cassette when positioned at said predetermined location within said receiving chamber means; and control means for selectively regulating said exposure means and said driven instrumentality means to perform in an order representing a predetermined sequence of operational events defining a photographic cycle, and for effecting a said performance of a said photographic cycle automatically in response to said securing of a said cassette within said receiving chamber means, so as to automatically remove said select photographic unit from said cassette.

17. The photographic apparatus of claim 16 in which said control means is operative to effect said exposure means optical path blockage when said photographic cycle is automatically carried out to remove said select photographic unit.

18. The photographic apparatus of claim 16 wherein said control means includes:

monitor means having a predetermined signal condition when a said cassette is presented within said receiving chamber means; and gate means responsive at least to said signal condition for effecting said exposure means optical path blockage throughout a said photograhic cycle automatically carried out to remove said select photographic unit.

19. The photographic apparatus of claim 16 where said control means includes:

monitor means having a predetermined signal condition when a said cassette is presented within said receiving chamber means;

means for effecting an initial said blockage of said optical path by said exposure means at the commencement of a said photographic cycle; and gate means responsive at least to said signal condition and to said optical path blockage for effecting the maintenance of said blockage throughout a said photographic cycle automatically carried out to remove said select photographic unit.

20. The photographic apparatus of claim 16 wherein said control means includes:

monitor means having a predetermined signal condition when a said cassette is presented within said receiving chamber means;

means for effecting an initial said blockage of said optical path by said exposure means at the commencement of a said photographic cycle; and gate means responsive to said signal condition and to said optical path blockage and to a given said operational event succeeding said initial optical path blockage for effecting a said exposure means optical path blockage throughout a said photographic cycle automatically carried out to remove said select photographic unit.

21. The photographic apparatus of claim 18 wherein said control means includes:

actuator means responsive to said access means movement into said given position for initiating said automatic cycle performance.

22. The photographic apparatus of claim 21 wherein:

said exposure means includes means for generating a signal to activate a source of artificial illumination; and said control means is operative automatically to suppress said signal generation when said automatic photographic cycle is carried out.

23. A system for exposing photographic material comprising:

a cassette configured to retain an assemblage of photographic units for sequential presentation thereof at an exposure opening and further configured having an egress portion for effecting removal of said units following said presentation; and a camera comprising:

a housing having receiving chamber means for receiving and retaining a said cassette;

exposure means mounted with said housing for controllably exposing photosensitive ones of said photographic units to light from a scene;

processing means operative, when activated, to remove the said presented one of said photographic units through said cassette egress portion;

drive means actuable to activate said processing means;

loading access means movable between open and closed positions for facilitating the insertion and removal of said cassette respectively into and from said receiving chamber means; and control means for selectively actuating said drive means, and being operative to automatically actuate said drive means in response to the positioning of a said cassette within said receiving chamber means and movement of said loading access means into said closed position.

24. The system of claim 23 in which:

said cassette includes a source of electrical power having terminal means; and said housing includes contact means communicable with said terminal means only when said cassette is properly within said receiving chamber means for supplying power to said control means.

25. The system of claim 23 wherein:

said exposure means includes means defining an optical path, and means for selectively blocking and unblocking said optical path to effect a photographic exposure; and said control means is operative to command said exposure means to block said optical path when said drive means is automatically actuated.

26. The system of claim 23 wherein:

said exposure means includes means for selectively generating a signal to activate a source of artificial illumination; and said control means is operative automatically to suppress said generation when said drive means is automatically actuated.

27. The photographic system of claim 23 wherein:

said loading access means includes door means movable into said closed position for securing a said cassette within said receiving chamber, and latch means movable into latching engagement with said door means for retaining said door means at said closed position; and said control means includes switch means actuable in response to said latch means movement into said latching engagement for effecting said automatic drive means actuation.

28. The system of claim 23 wherein said control means includes means positioned within said receiving chamber means and responsive to the removal of a said cassette from said receiving chamber means for enabling said control means to effect said automatic actuation of said drive means.

29. The system of claim 23 wherein said control means includes:

means for monitoring the status of said assemblage of photographic units; and switch means responsive to a predetermined condition of said monitoring means for enabling said control means to automatically actuate said drive means.

30. The photographic apparatus of claim 23 in which:

said loading access means includes door means movable into said closed position for securing a said cassette within said receiving chamber, and latch means movable into latching engagement with said door means for retaining said door means at said closed position; and wherein said control means includes actuator means responsive to said movement of said latch means into said latching engagement for initiating said drive means automatic actuation.

31. The system of claim 23 in which said control means includes:

counter means having at least one element, movable from an initial position corresponding with the removal of a said cassette from and subsequent insertion of a cassette within said receiving chamber means, for monitoring a predetermined sequence of said activations of said processing means; and switch means responsive to the position of said element, and having a unique circuit condition when said element is in said initial position, for enabling said control means to effect said automatic actuation of said drive means.

32. The system of claim 31 wherein:

said loading access means includes door means movable into said closed position for securing a said cassette within said receiving chamber, and latch means movable into latching engagement with said door means for retaining said door means at said closed position; and said control means includes switch means actuable in response to said latch means movement into said latching engagement for effecting said automatic drive means actuation.

33. The system of claim 32 wherein:

said exposure means includes means defining an optical path, and means for selectively blocking and unblocking said optical path to effect a photographic exposure; and said control means is operative to command said exposure means to block said optical path when said drive means is automatically actuated.

34. The system of claim 33 wherein:

said exposure means includes means for selectively generating a signal to activate a source of artificial illumination; and said control means is operative automatically to suppress said signal generation when said drive means is automatically actuated.

35. The system of claim 34 in which:

said cassette includes a source of electrical power having terminal means; and said housing includes contact means, communicable with said terminal means only when said cassette is properly within said receiving chamber means, for supplying power to said control means.

36. Photographic apparatus for use with a cassette configured to retain photographic units in an arrangement for presentation at an exposure station, comprising:

a housing having receiving means for removably positioning a said cassette in a predetermined location with respect to said exposure station, said receiving means including loading access means movable to a given position for securing said cassette at said predetermined location;

exposure means for controllably exposing photosensitive ones of said photographic units to light from a scene;

driven instrumentality means actuable to remove select ones of said photographic units from a said cassette when positioned at said predetermined location within said receiving means; and control means for actuating said driven instrumentality means automatically in response to said positioning of a said cassette in said predetermined location and to said movement of said loading access means to said given position.

37. Photographic apparatus for use with a cassette configured to retain photographic units in an arrangement for presentation at an exposure station, comprising:

a housing having receiving means for removably positioning a said cassette in a predetermined location with respect to said exposure station;

exposure means for controllably exposing photosensitive ones of said photographic units to light from a scene;

driven instrumentality means actuable to remove select ones of said photographic units from a said cassette when positioned at said predetermined location within said receiving means; and control means for actuating said driven instrumentality means automatically in response to said positioning of a said cassette in said predetermined location and including means positioned within said receiving means, responsive to the removal of a said cassette therefrom, for enabling said control means to effect said automatic actuation of said driven instrumentality means.

38. Photographic apparatus for use with a cassette configured to retain photographic units in an arrangement for presentation at an exposure station, comprising:

a housing having receiving means for removably positioning a said cassette in a predetermined location with respect to said exposure station;

exposure means for controllably exposing photosensitive ones of said photographic units to light from a scene;

driven instrumentality means actuable to remove select ones of said photographic units from a said cassette when positioned at said predetermined location within said receiving means; and control means for actuating said driven instrumentality means automatically in response to said positioning of a said cassette in said predetermined location, said control means including means for monitoring the status of photographic units within said cassette, and switch means responsive to a predetermined condition of said monitoring means for enabling said control means to effect said automatic actuation of said driven instrumentality means.

39. Photographic apparatus for use with a cassette configured to retain photographic units in an arrangement for presentation at an exposure station, comprising:

a housing having receiving means for removably positioning a said cassette in a predetermined location with respect to said exposure station;

exposure means for controllably exposing photosensitive ones of said photographic units to light from a scene, said exposure means including means for selectively activating a source of artificial illumination;

driven instrumentality means actuable to remove select ones of said photographic units from a said cassette when positioned at said predetermined location within said receiving means; and control means for actuating said driven instrumentality means automatically in response to said positioning of said cassette in said predetermined location, said control means being operative automatically to suppress said activation of said source of artificial illumination when said drive means is automatically actuated.

40. A photographic camera for use with a film cassette configured to retain a stacked array of discrete units including a plurality of photographic units, such units being adapted for sequential location at a predetermined position within said camera, said camera comprising:

a housing defining means for removably receiving such cassette and an opening through which one such unit disposed at such predetermined position may be progressively advanced from said camera;

means for automatically effecting a predetermined photographic cycle including means for exposing such one unit to light rays from a scene and means for advancing such one unit from said camera through said camera opening;

manually actuable means for selectively rendering said photographic cycle effecting means operative; and means, independent of said manually actuable means, for effecting the advancement of such one unit from said camera through said camera opening.

41. The camera of claim 40 wherein said unit advancement effecting means independent of said manually actuable means, is automatically responsive to the operative positioning of such cassette within said cassette receiving means.

42. A photographic camera for use with a film cassette configured to retain a stacked array of discrete units including a plurality of photograpic units, such units being adapted for sequential location at a predetermined position within said camera, said camera comprising:

a housing defining means for removably receiving such cassette and an opening through which one such unit disposed at said predetermined position may be progressively advanced from said camera;

means for automatically effecting a predetermined photographic cycle including means for exposing such one unit to light rays from a scene and means for advancing such one unit from said camera through said camera opening;

manually actuable means for selectively rendering said photographic cycle effecting means operative; and means, independent of said manually actuable means, for rendering said advancing means operative without rendering said exposing means operative.

43. A self-developing photographic camera for use with a film cassette configured to retain a stacked array of discrete units including a plurality of photographic units each having a pod of processing fluid and adapted for sequential location at a predetermined position within said camera, said camera comprising:

a housing defining means for removably receiving such cassette;

means for automatically effecting a predetermined photographic cycle including means for exposing one such unit disposed at said predetermined position to light rays from a scene and means for advancing such one unit from said predetermined position and for effecting the release of the fluid from its pod when a photographic unit is so advanced from said predetermined position;

manually actuable means for selectively rendering said photographic cycle effecting means operative; and means, independent of said manually actuable means, for selectively rendering said advancing means operative without rendering said exposing means operative.

44. The camera of claim 43 wherein said last-mentioned means is automatically responsive to the operative positioning of such cassette within said cassette receiving means.

45. A self-developing photographic camera for use with a film cassette configured to retain a stacked array of discrete units including a plurality of photographic units each having a pod of processing fluid, such units being adapted for sequential location at a predetermined position within said camera, said camera comprising:

a housing defining means for removably receiving such cassette and including an opening through which one such unit disposed at said predetermined position may be progressively advanced from said camera;

means for automatically effecting a predetermined photographic cycle including means for exposing such one unit to light rays from a scene and means for advancing such one unit from said predetermined position through said opening and for effecting the release of the fluid from its pod when a photographic unit is so advanced from said predetermined position;

manually actuable means for selectively rendering said photographic cycle effecting means operative; and means, independent of said manually actuable means, for selectively rendering said advancing means operative without rendering said exposing means operative.

* * * * *